United States Patent
Morimoto

(10) Patent No.: US 7,726,802 B2
(45) Date of Patent: Jun. 1, 2010

(54) INK SET FOR INKJET RECORDING, AND IMAGE RECORDING METHOD AND IMAGE RECORDING APPARATUS

(75) Inventor: Kiyoshi Morimoto, Ashigarakami-gun (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 519 days.

(21) Appl. No.: 11/727,844

(22) Filed: Mar. 28, 2007

(65) Prior Publication Data

US 2007/0229577 A1 Oct. 4, 2007

(30) Foreign Application Priority Data

Mar. 29, 2006 (JP) ............................. 2006-092307

(51) Int. Cl.
*G01D 11/00* (2006.01)
*C09D 11/00* (2006.01)
*C09D 13/00* (2006.01)

(52) U.S. Cl. .................. 347/100; 347/95; 106/31.28; 106/31.6; 106/31.33

(58) Field of Classification Search ................. 347/100, 347/21, 95; 106/31.13, 31.28, 31.6, 31.33, 106/31.65, 496; 523/160, 161
See application file for complete search history.

(56) References Cited

U.S. PATENT DOCUMENTS 6,264,312 B1 7/2001 Koitabashi et al.
6,840,610 B2 1/2005 Taniguchi et al.
6,846,072 B2 1/2005 Sato et al.
2003/0007051 A1 1/2003 Takahashi et al.
2007/0222832 A1 9/2007 Yahiro

FOREIGN PATENT DOCUMENTS

| JP | 09-234881 A | 9/1997 |
| JP | 2002-240323 A | 8/2002 |
| JP | 2003-003095 A | 1/2003 |
| JP | 2003-039810 A | 2/2003 |
| JP | 2003-246075 A | 9/2003 |
| JP | 2003-246077 A | 9/2003 |
| JP | 2004-010633 A | 1/2004 |
| JP | 2004-331751 A | 11/2004 |

*Primary Examiner*—Shih-Wen Hsieh
(74) *Attorney, Agent, or Firm*—Buchanan Ingersoll & Rooney PC

(57) ABSTRACT

The ink set for inkjet recording includes: a first liquid which contains at least a water-soluble solvent, water, and pigment particles dispersed and retained in a medium including the water-soluble solvent and the water; and a second liquid which does not contain coloring material but contains at least a water-soluble solvent, water, and a liquid composition which enhances printing characteristics, wherein: an image is formed by making the first liquid and the second liquid come into contact with each other on a recording medium; and a ratio of pigment particles having a particle diameter of not less than 150 nm is not greater than 2 volume percent with respect to a whole of the pigment particles contained in the first liquid.

13 Claims, 8 Drawing Sheets

US 7,726,802 B2

INK SET FOR INKJET RECORDING, AND IMAGE RECORDING METHOD AND IMAGE RECORDING APPARATUS

BACKGROUND OF THE INVENTION

1. Field of the Invention

The present invention relates to an ink set for inkjet recording, and an image recording method and apparatus, and more particularly to an ink set for inkjet recording, an image recording method and apparatus which satisfy the requirements of achieving high fixing characteristics, increasing the reproduction range of secondary colors, and ensuring optical density and preventing bleeding in the case of high-speed printing.

2. Description of the Related Art

Various recording media have come to be used as inkjet recording media, and there are demands for high-quality image formation even when using standard commercial paper. On the other hand, with regard to the ink, a pigment is desirable as an ink material which ensures good image fastness, such as waterproofing or light resistance, and various investigations have been carried out in this respect. However, if recording is carried out onto normal paper, then problems may arise in the form of significant bleeding, and inadequate coloring density and fixing properties. There have also been demands from users for higher speed operation in inkjet recording, and high-speed printing capability is also demanded in single pass methods which are capable of recording by means of a single scan of the head, as well as in shuttle scanning systems.

As a means for preventing bleeding and improving coloration density on normal paper, a method is known which brings a liquid composition that reacts with the ink into contact with the ink (i.e., mixes the liquid composition with the ink), on the recording medium. Two typical examples of this are shown below.

(1) A method has been proposed in which, in order to mix a liquid composition that reacts with the ink, on the recording medium, and to improve image density, improve water resistance and suppress bleeding, a liquid composition which ensures a satisfactory image is applied to the recording medium before or after spraying ink for recording the recorded image. For example, Japanese Patent Application Publication No. 2004-10633 discloses an ink set having excellent optical density, bleeding characteristics, color mixing characteristics, and drying time, by using a liquid composition which has an action of causing the pigment to aggregate. However, it has been found that this cannot be regarded as satisfactory from the viewpoint of fixing characteristics and color reproduction (especially in respect of the reproduction of secondary colors).

(2) As a method for mixing an ink and a liquid composition containing very fine particles, on the recording medium, it has been proposed to use a combination of an ink containing a very fine particle pigment and an aqueous liquid composition containing very fine particles having their surfaces charged to the opposite polarity with respect to the ink, in a dispersed state. For example, Japanese Patent Application Publication No. 2003-39810 discloses a method which achieves a broad color reproduction range on normal paper, and eliminates color non-uniformities or bleeding, by using a pigment having an average particle size of 60 nm or less and a cumulative 90% particle size in the volume particle diameter distribution of 100 nm or less. However, it has been judged that this is not of a satisfactory level from the viewpoint of optical density or bleeding in the case of high-speed printing involving consecutive ejections of adjacent dots, which is essential in single pass recording.

Furthermore, Japanese Patent Application Publication No. 2003-3095, for example, discloses forming a pigment to a very fine particle size in order to achieve good coloration characteristics in an aqueous pigment-based ink, and to improve the scratching resistance of the image portion, in other words, to improve fixing characteristics. It is proposed that the average particle size of the pigment should be in the range of 50 to 100 nm, and that 50% or more of the dispersed pigment in the particle size distribution should be in the range of 50 to 150 nm.

In view of this background, the present inventor used the pigment-based ink according to Japanese Patent Application Publication No. 2003-3095 in the method (1) described above, which mixes an ink with a liquid composition that reacts with the ink on the recording medium; however, it was found that this was not of a satisfactory level from the viewpoint of the fixing characteristics and color reproduction (and in particular, reproduction of secondary colors).

SUMMARY OF THE INVENTION

The present invention was contrived in view of the aforementioned circumstances, an object thereof being to provide an ink set, an image recording method and an image recording apparatus, whereby, when an image is formed on various types of normal commercial paper, for example, it is possible to satisfy the conditions of achieving good fixing characteristics and a broader color reproduction range for secondary colors, as well as ensuring optical density and preventing bleeding in the case of high-speed printing.

When the present inventor employed the pigment particles disclosed in Japanese Patent Application Publication No. 2003-3095 as a first liquid, together with a second liquid containing a liquid composition which enhances printing characteristics, and then evaluated the results under conditions of high-speed continuous droplet ejection for mutually adjacent dots, the coloration and fixing characteristics were not necessarily adequate and there was a need for improvements. It was sought to improve the issue of achieving good fixing characteristics and a broader reproduction range for secondary colors, as well as ensuring optical density and preventing bleeding in the case of high-speed printing, by forming the pigment as very fine particles having a volume average particle size (diameter) of 110 nm, 65 nm and 55 nm, respectively. However, it was not possible to resolve the problem simply by reducing the volume average particle size of the pigment. This reason for this is considered to be the following: in a two-liquid droplet ejection method which improves coloration characteristics and prevents bleeding by causing a pigment-based ink to aggregate by means of a liquid for enhancing printing characteristics, it is possible that when the pigment particles aggregate, the aggregated particles increase the particle size in optical terms.

However, it was discovered that these problems could be resolved by ensuring that the ratio of pigment particles having a size of 150 nm or above accounted for not more than 2% by volume of the whole of the pigment particles contained in the first liquid. More specifically, it was discovered that, in a system using a two-liquid droplet ejection method which employs a first liquid and a second liquid, it is not sufficient to simply reduce the volume average particle size of the pigment particles, and that the ratio of pigment particles of large particle size in the particle size distribution has a large effect on achieving good fixing characteristics and a broader color reproduction range for secondary colors, and ensuring optical density and preventing bleeding in the case of high-speed printing. The present invention was contrived on the basis of these findings.

The present invention is directed to an ink set for inkjet recording comprising: a first liquid which contains at least a water-soluble solvent, water, and pigment particles dispersed and retained in a medium including the water-soluble solvent and the water; and a second liquid which does not contain coloring material but contains at least a water-soluble solvent, water, and a liquid composition which enhances printing characteristics, wherein: an image is formed by making the first liquid and the second liquid come into contact with each other on a recording medium; and a ratio of pigment particles having a particle diameter of not less than 150 nm is not greater than 2 volume percent with respect to a whole of the pigment particles contained in the first liquid.

In an ink set which includes the first liquid and the second liquid described above according to this aspect of the present invention, the ratio of pigment particles having a particle size equal to or greater than 150 nm is set to be 2 volume % or less with respect to the whole of the pigment particles contained in the first liquid, and therefore, even when an image is formed on various types of recording media, such as normal commercial papers, it is still possible to satisfy the conditions of achieving good fixing characteristics and a broader reproduction range for secondary colors, as well as ensuring optical density and preventing bleeding in the case of high-speed printing.

In this case, it is even more desirable if the ratio described above is satisfied and if the volume average particle size of the pigment particles is in the range of 30 to 90 nm. More desirably, the volume average particle size is in the range of 40 to 80 nm. The recording medium may also include an intermediate transfer medium.

Preferably, the ratio is not greater than 1 volume percent.

Preferably, the ratio is not greater than 0.5 volume percent.

In these aspects of the present invention, desirable values for the ratio of pigment particles having a particle size equal to or greater than 150 nm are specified; desirably, this ratio is 1 volume % or less, and especially desirably, it is 0.5 volume % or less.

Preferably, at least one of the first liquid and the second liquid further comprises polymer microparticles.

Fixing characteristics and wear resistance can be improved if at least one of the first liquid and the second liquid comprises polymer micro-particles. Desirably, the polymer micro-particles are dispersed as a polymer latex in water and a hydrous organic solvent.

Preferably, a glass transition temperature Tg of the polymer microparticles is not less than 30° C.

From the viewpoint of ink storage stability, it is desirable that the glass transition temperature Tg of the polymer microparticles should be equal to or greater than room temperature, and more specifically, equal to or greater than 30° C. Furthermore, more desirably, the glass transition temperature Tg is equal to or greater than 40° C., and especially desirably, equal to or greater than 50° C. Possibilities such as stickiness of the print sample can be envisaged in the case where the polymer micro-particles have a high glass transition temperature Tg, but by performing heating after printing, it is possible to reduce problems of stickiness or the like, even when polymer micro-particles having a high glass transition temperature Tg are used.

Preferably, one of the first liquid and the second liquid is alkaline, and the other of the first liquid and the second liquid is acidic; and the second liquid has an action of causing the pigment particles contained in the first liquid to aggregate when the first liquid and the second liquid come into contact with each other.

By using a two-liquid droplet ejection method for forming an image where the first liquid and the second liquid are brought into contact with each other on the recording medium to cause the pigment particles to aggregate, it is possible to improve the optical density, bleeding characteristics, color mixing characteristics, and drying time of the formed image, in comparison with a method where only droplets of a first liquid containing pigment particles are ejected onto a recording medium to form an image.

Preferably, the liquid composition contained in the second liquid has an action of causing the pigment particles contained in the first liquid to aggregate; and the liquid composition contains one of a polyvalent metallic salt and polyarylamine.

In this aspect of the present invention, the second liquid contains a component (liquid composition) which causes the pigment particles contained in the first liquid to aggregate, and the liquid composition containing polyvalent metallic salt or polyarylamine has good characteristics in causing aggregation of the pigment particles.

Preferably, an absolute value of a pH differential between the first liquid and the second liquid is not less than 3.0 and not greater than 5.5.

It is desirable in terms of the aggregation of the pigment particles that the absolute value of the pH difference between the first liquid and the second liquid should be in the range of equal to or greater than 3.0 and equal to or less than 5.5.

Preferably, the pigment particles are any one of C.I. Pigment Yellow 12, 17, 55, 74, 97, 120, 128, 151, 155 and 180.

Preferably, the pigment particles are any one of C.I. Pigment Red 122, C.I. Pigment Violet 19, C.I. Pigment Red 57:1 and 146, and C.I. Pigment Blue 15:3.

In these aspects of the present invention, examples of desirable pigment particles for use in the present invention are given.

The present invention is also directed to an ink unit in which at least black ink, cyan ink, magenta ink and yellow ink are taken as one unit, wherein all of the black ink, the cyan ink, the magenta ink and the yellow ink are constituted by any one of the ink sets for inkjet recording described above.

The ink set according to the present invention may be applied to the each colored ink of an ink unit comprising inks of various colors (including, at the least, black ink, cyan ink, magenta ink and yellow ink). Accordingly, even when an image is formed with inks of various colors on various types of recording media, such as normal commercial paper, it is still possible to satisfy the conditions of achieving good fixing characteristics and a broader reproduction range for secondary colors, and ensuring optical density and preventing bleeding in the case of high-speed printing.

The present invention is also directed to an image recording method using any one of the ink sets for inkjet recording described above, including the steps of: applying the second liquid of the ink set to the recording medium; and applying the first liquid of the ink set to the second liquid so that the first liquid and the second liquid come into contact with each other to form an image.

The present invention is also directed to an image recording apparatus using any one of the ink sets for inkjet recording described above, comprising: a first application device which applies the second liquid of the ink set to the recording medium; a second application device which applies the first liquid of the ink set to the second liquid on the recording medium; and a heating device which heats an aggregate produced by contact between the first liquid and the second liquid.

In these aspects of the present invention, the ink set for inkjet recording according to the present invention is applied to an image recording method and image recording apparatus which uses a two-liquid droplet ejection method. Hence, it is possible to provide an image recording method and apparatus having good properties in terms of achieving good fixing characteristics and a broader reproduction range for secondary colors, as well as ensuring optical density and preventing bleeding in the case of high-speed printing, even when an image is formed on various different types of recording media, such as various normal commercial papers, for instance. The recording medium may also include an intermediate transfer medium.

According to the present invention, it is possible to obtain satisfactory coloration density, reduce bleeding, increase the reproduction range of secondary color, and achieve good fixing characteristics, when high-speed printing is carried out onto normal paper, in particular.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
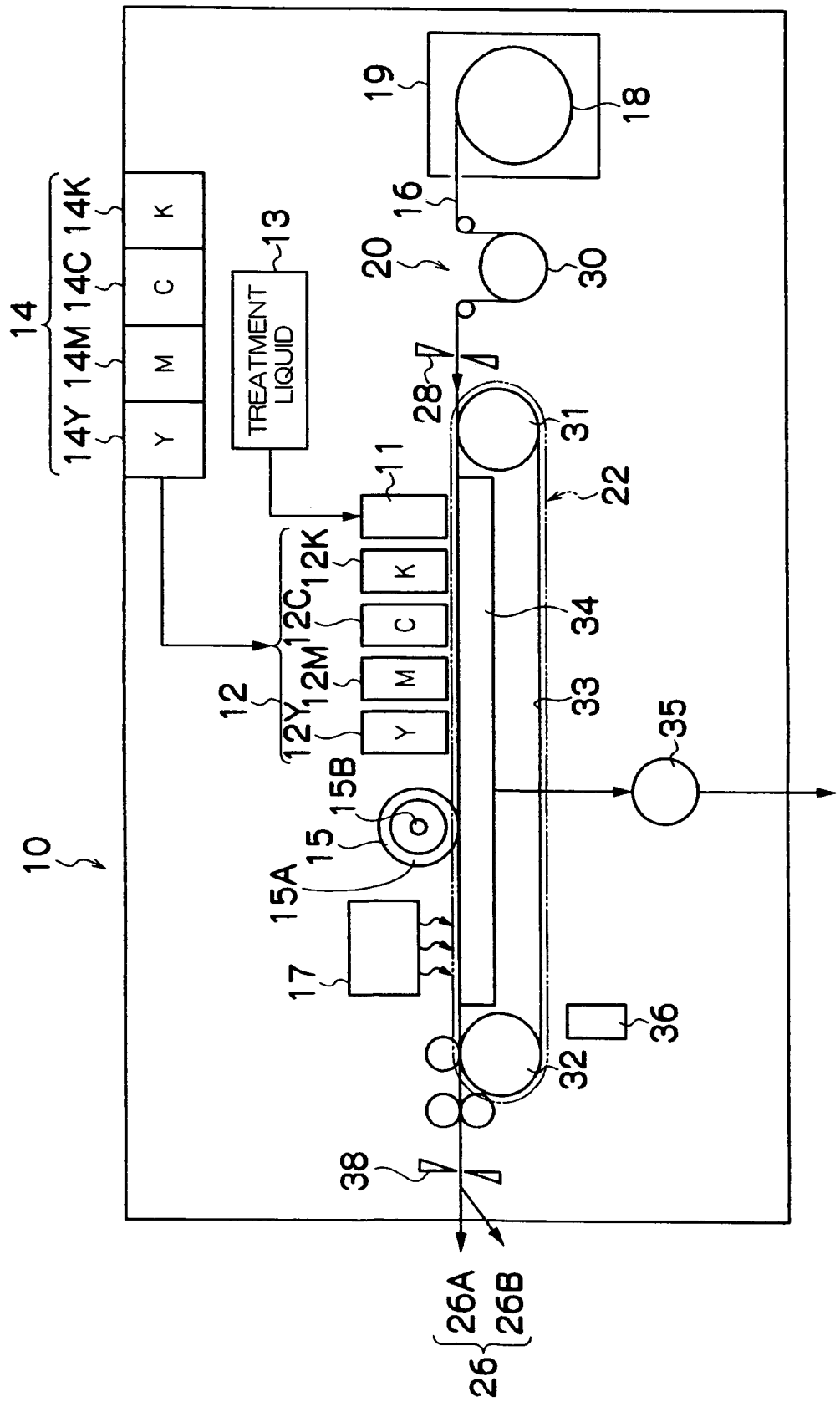
FIG. 1 is a general compositional diagram showing an inkjet recording apparatus forming an image forming apparatus according to an embodiment of the present invention.

As a result of thorough investigation aimed at achieving the aforementioned objects, the present inventor discovered that, not only in a shuttle scanning system, but also in the case of high-speed continuous droplet ejection of mutually adjacent dots in a single-pass system which is capable of recording by means of a single head scan, it is possible to obtain sufficient coloration density, reduction of bleeding, a broader reproduction range for secondary colors, and good fixing characteristics, by combining a specific pigment-based ink having pigment particles which satisfy the ratio according to the present invention, with a specific liquid which enhances printing characteristics.

In other words, it is possible to satisfy the conditions of achieving good fixing characteristics and a broader color reproduction range for secondary colors, as well as ensuring optical density and preventing bleeding in the case of high-speed printing, by setting the ratio occupied by pigment particles having a particle size of 150 nm or above to be not more than 2% by volume of the whole of the pigment particles contained in a first liquid of an ink set for a two-liquid droplet ejection method that uses a first liquid which contains at least a water-soluble solvent, water, and pigment particles dispersed and retained in a medium, and a second liquid, which does not contain coloring material and comprises at least a water-soluble solvent, water and a liquid composition that enhances printing characteristics. In this case, a more desirable ratio is 1% by volume or less, and a particularly desirable ratio is 0.5% by volume or less.

The particle size according to the present invention can be measured by means of a standard method, but it may also be measured, for example, by using a particle size spectrometer UPA 150 manufactured by Nikkiso Co., Ltd.

Next, an ink set for inkjet recording according to the present invention is described below.

In describing an embodiment of the present invention, the first liquid may be referred to as ink and the second liquid may be referred to as treatment liquid.

Ink Set for Inkjet Recording

An ink set for inkjet recording according to the present invention is principally constituted by a first liquid containing at least a water-soluble solvent, water and pigment particles dispersed and retained in the medium, and a second liquid, which does not contain coloring material, comprising at least a water-soluble solvent, water and a liquid composition which improves printing characteristics.

First Liquid

In the present invention, as described on p. 518 of the Kagaku Daijiten (Dictionary of Chemistry) Edition 3, published 1 Apr. 1994 (edited by Michinori OKI et al.), "pigment" is a general term for a colored material that is virtually insoluble in water or an organic solvent (including white materials in the case of inorganic pigments), and there exist organic pigments and inorganic pigments.

Furthermore, in the present invention, a "pigment dispersed and retained in a medium" is used, and the medium may or may not contain a dispersant. The medium used may be lipophilic medium or an aqueous medium, and an aqueous medium is desirable.

As a desirable example of a pigment contained in the first liquid of the present invention, it is possible to cite a pigment of a self-dispersing type. A self-dispersing type of pigment is a pigment in which a plurality of hydrophilic functional groups and/or salts of same (hereinafter, called "dispersibility imparting groups") are bonded to the surface of the pigment directly or indirectly by means of an alkyl group, an alkyl ether group, an aryl group, or the like, in such a manner that the pigment can be dispersed in an aqueous solvent without a dispersant. Here, "can be dispersed in an aqueous solvent without a dispersant" indicates a state where the pigment can be dispersed in an aqueous solvent even without using a dispersant in order to disperse the pigment.

An ink containing a self-dispersing type of pigment as a colorant does not require the inclusion of a dispersant such as that described above, which is included in order to cause dispersion of a normal pigment. Consequently, there is virtually none of the foaming caused by reduction in the anti-foaming properties that may arise when a dispersant is present, and hence an ink having good ejection stability can be manufactured easily.

Possible examples of a dispersibility imparting group that bonds to the surface of the self-dispersing type of pigment include —COOH, —CO, —OH, —SO$_3$H, —PO$_3$H$_2$ and quaternary ammonium, and salts of these, and these are manufactured by subjecting the pigment starting material to physical processing or chemical processing, in such a manner that the aforementioned dispersibility imparting group or an active species having the aforementioned dispersibility imparting group is bonded (grafted) to the surface of the pigment. Vacuum plasma processing, for instance, may be cited as an example of physical processing. Furthermore, examples of methods of the chemical processing include a wet oxidation method which oxidizes the pigment surface by means of an oxidant, in water, and a method which bonds a carboxyl group by means of a phenyl group, by bonding a p-aminobenzoic acid to the surface of the pigment.

In the present invention, from the viewpoint of good coloration characteristics, it is desirable to use a self-dispersing type of pigment which has been surface treated by means of an oxidation process based on a hypohalous acid and/or hypohalous acid salt, or an oxidation process based on ozone.

It is also possible to use a commercially available self-dispersing type of pigment, such as Microjet CW-1 (trade name; manufactured by Orient Chemical Industries Ltd.), or CAB-O-JET 200 and CAB-O-JET 300 (trade names; manufactured by Cabot Corporation), or the like.

Desirably, the content ratio of the self-dispersing type of pigment in the ink of the present invention is in the range of 2 to 20 wt % (percent by mass).

Furthermore, it is also possible to cite a micro-capsulated pigment as a desirable example of a pigment contained in the first liquid of the present invention. A micro-capsulated pigment is one in which the pigment is covered with a resin.

There are no particular restrictions on the resin used for a micro-capsulated pigment, but desirably, it should be a compound of high molecular weight which has a self-dispersing capability and solubility in water, and contains an anionic group (acidic). Generally, it is desirable that the resin should have a number average molecular weight in the approximate range of 1,000 to 100,000, and especially desirably, in the approximate range of 3,000 to 50,000. Moreover, desirably, this resin is dissolved in an organic solvent to form a solution. By limiting the number average molecular weight of the resin to this range, it is possible to make the resin display satisfactory functions as a covering film for the pigment, or as a coating film in the ink composition.

The resin may itself have a self-dispersing capability or solubility, or these functions may be added or introduced. Consequently, for example, it is possible to use a resin having an introduced carboxyl group, sulfonic acid group, or phosphonic acid group or another anionic group, by neutralizing with an organic amine or alkali metal. Moreover, it is also possible to use a resin into which one or two or more anionic groups of the same type or different types have been introduced. In the present invention, it is desirable to use a resin which has been neutralized by means of base and which contains an introduced carboxyl group.

In this way, in the present invention, it is desirable to use a resin in the form of a salt of an alkali metal or organic amine. If a resin is used in the form of a salt, then it is possible to provide an ink having good redispersibility and reliability. Specific examples of a salt of a resin and an alkali metal include: lithium, sodium and potassium salts; desirably, alkali metal salts of sodium hydroxide, potassium hydroxide, lithium hydroxide; and more desirably, a salt of potassium hydroxide. Furthermore specific examples of a salt of a resin and an organic amine include: salts of volatile amine compounds, such as ammonia, triethyl amine, tributyl amine, dimethyl ethanol amine, diisopropanol amine, and morpholine; and salts of non-volatile high-boiling-point organic amines, such as diethanol amine and triethanol amine.

Specific examples of resins for the micro-capsulated pigment include: polyvinyl materials, such as vinyl chloride, vinyl acetate, polyvinyl alcohol, and polyvinyl butyral; polyester materials, such as an alkyd resin and a phthalate resin; amino materials such as a melamine resin, a melamine formaldehyde resin, an amino alkyd co-condensation resin, and a urea resin; or materials containing an anionic group, such as a thermoplastic or thermosetting or denatured acrylic, epoxy, polyurethane, polyester, polyamide, unsaturated polyester, phenol, silicone, or fluorine-based polymer compound, or copolymers or mixtures of these.

Before using the resin for the micro-capsulated pigment, a reactive/active group, such as a glycidil group, an isocyanate group, a hydroxyl group or an α,β-ethylenic unsaturated double bond (vinyl group) may be attached as a pendant group to the actual resin, or a cross-linking agent having a reactive/active group, for example, a photocuring agent, such as a melamine resin, a urethane resin, an epoxy resin, an ethylenic unsaturated monomer or oligomer, or the like, may be mixed with the resin. By subjecting the resin to processing of this kind, it is possible further to improve the properties of the resin, such as the solvent resistance and durability of the pigment covering, and a further benefit is obtained in terms of improved film strength after the ink has formed a coating film on the recording medium.

Of the resins described above, an anionic acrylic resin can be obtained, for example, by polymerizing an acrylic monomer having an anionic group (hereinafter, called an "anionic group-containing acrylic monomer) and, according to requirements, another monomer which can be copolymerized with this monomer, in a solvent. The anionic group-containing acrylic monomer may be, for example, an acrylic monomer having one or more anionic group selected from a group consisting of a carboxyl group, a sulfonic acid group and a phosphonic group, and of these, an acrylic monomer having a carboxyl group is particularly desirable.

Specific examples of an acrylic monomer having a carboxylic group include: acrylic acid, methacrylic acid, crotonic acid, ethacrylic acid, propyl acrylic acid, isopropyl acrylic acid, itaconic acid, fumaric acid, or the like. Of these, acrylic acid or methacrylic acid is desirable. Specific examples of acrylic monomers having a sulfonic acid group include: sulfoethyl methacrylate, butyl acrylamide sulfonic acid, and the like. Specific examples of acrylic monomers having a phosphonic group include: phosphoethyl methacrylate, and the like.

Specific examples of other monomers which can be copolymerized with an anionic group-containing acrylic monomer include: (meth)acrylic acid esters, such as methyl acrylate, ethyl acrylate, isopropyl acrylate, n-propyl acrylate, n-butyl acrylate, t-butyl acrylate, 2-ethyl hexyl acrylate, n-octyl acrylate, lauryl acrylate, benzyl acrylate, methyl methacrylate, ethyl methacrylate, isopropyl methacrylate, n-propyl methacrylate, n-butyl methacrylate, isobutyl methacrylate, t-butyl methacrylate, 2-ethyl hexyl methacrylate, n-octyl methacrylate, lauryl methacrylate, stearyl methacrylate, tridecyl methacrylate, benzyl methacrylate, and the like; an addition reaction product of an oil fatty acid and a (meth)acrylic acid ester monomer having an oxirane structure, such as an addition reaction product of stearic acid and glycidyl methacrylate; an addition reaction product of (meth)acrylic acid and an oxirane compound containing an alkyl group having three or more carbon atoms; a styrene monomer, such as styrene, α-methyl styrene, o-methyl styrene, m-methyl styrene, p-methyl styrene, p-tert-butyl styrene, or the like; an itaconic acid ester, such as benzyl itaconate; a malleinic acid ester, such as dimethyl malleinate; a fumaric acid ester, such as dimethyl fumarate; acrilonitrile, methacrylonitrile, vinyl acetate, isobomyl acrylate, isobomyl methacrylate, aminoethyl acrylate, aminopropyl acrylate, methyl aminoethyl acrylate, methyl aminopropyl acrylate, ethyl aminoethyl acrylate, ethyl aminopropyl acrylate, aminoethyl amide acrylate, aminopropyl amide acrylate, methyl aminoethyl amide acrylate, methyl aminopropyl amide acrylate, ethyl aminoethyl amide acrylate, ethyl aminopropyl amide acrylate, amide methacrylate, aminoethyl methacrylate, aminopropyl methacrylate, methyl aminoethyl methacrylate, methyl aminopropyl methacrylate, ethyl aminoethyl methacrylate, ethyl aminopropyl methacrylate, aminoethyl amide methacrylate, aminopropyl amide methacrylate, methyl aminoethyl amide methacrylate, methyl aminopropyl amide methacrylate, ethyl aminoethyl amide methacrylate, ethyl aminopropyl amide methacrylate, hydroxymethyl acrylate, 2-hydroxyethyl acrylate, 2-hydroxypropyl acrylate, hydroxymethyl methacrylate, 2-hydroxyethyl methacrylate, 2-hydroxypropyl methacrylate, N-methylol acryl amide, allyl alcohol, or the like.

Possible examples of a monomer containing a cross-linking functional group include those described below. A polymerizable monomer having a block isocyanate group can be manufactured readily by adding and reacting a commonly known blocking agent, with a polymerizable monomer having an isocyanate group, such as 2-methacryl oxyethyl isocyanate, or the like. Alternatively, it may be manufactured readily by adding and reacting a compound having an isocyanate group and a block isocyanate group, with a vinyl copolymer having a hydroxyl group and carboxyl group as described above. The compound having an isocyanate group and a block isocyanate group can be obtained easily by adding and reacting a commonly known blocking agent, with a diisocyanate compound, at a rate of 1:1 by mol ratio.

The monomer having an epoxy group may be, for example, glycidyl (meth)acrylate, a (meth)acrylate monomer having an alicyclic epoxy group, or the like. Possible examples of a monomer having a 1,3-dioxolane-2-one-4-yl group, include: 1,3-dioxolane-2-one-4-yl methyl(meth)acrylate, 1,3-dioxolane-2-one-4-yl methyl vinyl ether, and the like.

Possible examples of a polymerization initiator include: peroxide compounds, such as t-butyl peroxybenzoate, di-t-butyl peroxide, cumene perhydroxide, acetyl peroxide, benzoyl peroxide, lauroyl peroxide, and the like; azo compounds, such as azo bis-isobutyl nitrile, azo bis-2,4-dimethyl valeronitrile, azo bis-cyclohexane carbonitrile; and the like.

As examples of a solvent used when polymerizing an anionic group-containing acrylic monomer and, according to requirements, another monomer which can be copolymerized with these monomers, it is possible to cite: an aliphatic hydrocarbon-based solvent such as hexane or mineral spirit; an aromatic hydrocarbon-based solvent such as benzene, toluene or xylene; an ester-based solvent such as butyl acetate; a ketone-based solvent, such as methyl ethyl ketone or isobutyl methyl ketone; an alcohol-based solvent, such as methanol, ethanol, butanol or isopropyl alcohol; or an aprotic polar solvent, such as dimethyl formamide, dimethyl sulfoxide, N-methyl pyrrolidone or pyridine. It is also possible to use two or more types of these solvents, in combination.

In the present invention, desirably, the resin which coats the pigment also contains a curing agent and/or a polymer compound. More desirably, the pigment is also coated with a curing agent and/or polymer compound. The curing agent or polymer compound has the action of curing the covering shell of the colorant, and increasing the strength of the coating film when it is used in an ink.

Specific examples of a curing agent which can be used in the present invention include: melamine resin; amino resins such as benzoguanamine resin and urea resin; phenol resins such as trimethylol phenol and a condensate of same; polyisocyanates, such as tetramethylene diisocyanate (TDI), diphenyl methane diisocyanate (MDI), hexamethylene diisocyanate (HDI), naphthalene diisocyanate (NDI), isophorone diisocyanate (IPDI), xylylene diisocyanate (XDI), and denatured isocyanates or block isocyanates of these, and the like; amines, such as an aliphatic amine, an aromatic amine, N-methyl piperazine, triethanol amine, morpholin, dialkyl aminoethanol, benzyl dimethyl amine, and the like; acid anhydrides, such as a polycarboxylic acid, anhydrous phthalic acid, anhydrous malleinic acid, anhydrous hexahydrophthalic acid, anhydrous pyromellitic acid, anhydrous benzophenone tetracarboxylic acid, ethylene glycol bis-trimellitate, and the like; a bisphenol A type epoxy resin, a phenol type epoxy resin, a glycidyl methacrylate copolymer, a glycidyl ester resin of carboxylic acid, an epoxy compound such as an alicyclic epoxy; alcohols, such as polyether polyol, polybutadiene glycol, polycaprolactone polyol, tris-hydroxyethyl isocyanate (THEIC), and the like; a polyvinyl compound, which is a compound containing an unsaturated group used for radical curing by means of a peroxide, UV curing, or electron beam curing; polyaryl compounds, vinyl compounds, such as a reaction product of a glycol or polyol and acrylic acid or methacrylic acid; and the like.

Furthermore, according to requirements, it is desirable to add a light-activated initiator, a polymerization initiator, or a catalyst, in order to promote curing. As examples of a light-activated initiator, it is possible to cite benzoins, anthraquinones, benzophenones, sulfurous compounds, dimethyl benzyl ketal, and the like, but the initiator is not limited to these examples. Possible examples of a polymerization initiator include: peroxide compounds, such as t-butyl peroxybenzoate, di-t-butyl peroxide, cumene perhydroxide, acetyl peroxide, benzoyl peroxide, lauroyl peroxide, and the like; azo compounds, such as azo bis-isobutyl nitrile, azo bis-2,4-dimethyl valeronitrile, azo bis-cyclohexane carbonitrile; and the like. Possible examples of a catalyst include a Co compound, a Pb compound, and the like.

There are no particular restrictions of the polymer compound which can be used in the present invention, provided that it has a number average molecular weight of 1,000 or above; however, from the viewpoint of the strength of the ink film and the manufacturability of the pigment covering, a compound having a number average molecular weight in the range of 3,000 to 100,000 is desirable.

There are no particular restrictions on the type of polymer compound used, and possible examples include: polyvinyl materials, such as vinyl chloride, vinyl acetate, polyvinyl alcohol, and polyvinyl butyral; polyester materials, such as an alkyd resin or a phthalate resin; amino materials such as a melamine resin, a melamine formaldehyde resin, an amino alkyd co-condensation resin, a urea resin, and a uric acid resin; and a thermoplastic or thermosetting or denatured acrylic, epoxy, polyurethane, polyester, polyamide, unsaturated polyester, phenol, silicone, or fluorine-based polymer compound, and copolymers and mixtures of these, and the like.

Manufacture of Micro-capsulated Pigment

The micro-capsulated pigment can be manufactured from the components described above, using a conventional physical or chemical method. In a desirable mode of the present invention, the pigment can be manufactured by means of the method described in Japanese Patent Application Publication No. 9-151342, Japanese Patent Application Publication No. 10-140065, Japanese Patent Application Publication No. 11-209672, Japanese Patent Application Publication No. 11-172180, Japanese Patent Application Publication No. 10-25440, or Japanese Patent Application Publication No. 11-43636. The methods of manufacture disclosed in these publications are outlined below.

Japanese Patent Application Publication No. 9-151342 and Japanese Patent Application Publication No. 10-140065 describe a phase inversion method and an acid precipitation method.

a) Phase Inversion Method

In the present invention, a phase inversion method basically means a self-dispersion method (phase inversion emulsification method) by which a fused mixture of a pigment and a resin having a self-dispersing capability or solubility are dispersed in water. Furthermore, this fused mixture may include the curing agent or polymer compound described above. Here, this fused mixture may be in either a mixed and undissolved state, or a mixed and dissolved state, or both of these states.

b) Acid Precipitation Method

In the present invention, the acid precipitation method is a method for manufacturing a micro-capsulated pigment by preparing an aqueous cake comprising resin and pigment and neutralizing one part or all of an anionic group contained in the resin in the aqueous cake.

More specifically, the acid precipitation method comprises: (1) a step of creating a resin gel by dispersing a resin and a pigment in an alkali aqueous medium and carrying out heat treatment as required; (2) a step of making the resin hydrophobic and thus fixing the resin strongly to the pigment, by making the pH neutral or acidic; (3) a step of obtaining an aqueous cake by carrying out filtering and washing, according to requirements; (4) a step of neutralizing all or a portion of the anionic group contained in the resin in the aqueous cake, by using a basic compound, and then redispersing in an aqueous medium; and (5) a step of achieving gelation of the resin by carrying out heat treatment, according to requirements. The specific methods of manufacture based on phase inversion and acid precipitation described above are the same as those disclosed in Japanese Patent Application Publication No. 9-151342 and Japanese Patent Application Publication No. 10-140065.

Japanese Patent Application Publication No. 11-209672 and Japanese Patent Application Publication No. 11-172180 disclose a method of manufacturing a colorant. In general terms, this method of manufacture basically comprises the following manufacturing steps.

(1) A step of mixing and neutralizing a resin having an anionic group, or a solution in which this resin is dissolved in an organic solvent, with a basic compound; (2) a step of obtaining a pigment dispersion solution by creating a suspension solution by mixing pigment with the mixed solution from (1), and then dispersing the pigment by means of a dispersion machine, or the like; (3) a step of evaporating and removing solvent, as required; (4) a step of coating the pigment with the resin having an anionic group, by adding an acidic compound and causing the resin having an anionic group to precipitate; (5) a step of filtering and washing, according to requirements; and (6) a step of neutralizing the anionic group of the resin having an anionic group by adding a basic compound, and dispersing it in an aqueous medium to yield an aqueous dispersion. More specific methods of manufacture are similar to those disclosed in Japanese Patent Application Publication No. 11-2096722 and Japanese Patent Application Publication No. 11-172180.

With regard to the pigment which can be used in the present invention, possible examples of a pigment for a yellow ink include: C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, 180, and the like.

Furthermore, possible examples of a pigment for a magenta ink include: C.I. Pigment Red 1, 2, 3, 4, 5, 6, 7, 8, 9, 10, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (colcothar), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, and the like; and C.I. Pigment Red 122 is especially desirable.

Furthermore, possible examples of a pigment for a cyan ink include: C.I. Pigment Blue 1, 2, 3, 15, 15:1, 15:2, 15:3, 15:34, 16, 17:1, 22, 25, 56, 60; C.I. Vat Blue 4, 60, 63, and the like; and C.I. Pigment Blue 15:3 is particularly desirable.

Possible examples of other pigments for inks of colors include: C.I. Pigment Orange 5, 13, 16, 17, 36, 43, 51; C.I. Pigment Green 1, 4, 7, 8, 10, 17, 18, 36; C.I. Pigment Violet 1 (rhodamine lake), 3, 5:1, 16, 19 (quinacridone red), 23, 38, and the like. Apart from these, it is also possible to use processed pigments such as grafted carbon in which the pigment surface has been processed with resin, or the like.

For black ink, it is possible to use carbon black, for example. Specific examples of carbon blacks of this kind include: No. 2300, No. 900, MCF88, No. 33, No. 40, No. 45, No. 52, MA7, MA8, MA100, No 2200B, and the like, manufactured by Mitsubishi Chemical Corporation; Raven 5750, Raven 5250, Raven 5000, Raven 3500, Raven 1255, Raven 700, and the like, manufactured by Columbian Chemical Co; Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like, manufactured by Cabot Corp.; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like, manufactured by Degussa Engineered Carbons, LP.

The aforementioned pigments may be used independently, but it is also possible to use a combination of a plurality of pigments, selected from one of the groups described above or selected from different groups.

In the present invention, it is possible to use a polymer dispersant in order to disperse the pigment in the primary liquid. On the other hand, if a pigment that is self-dispersible in water is used, then it is also possible to use a polymer dispersant, additionally. The polymer dispersant used may be a non-ionic compound, an anionic compound, a cationic compound, a bipolar compound, or the like.

For example, it is possible to use a copolymer of a monomer having an $\alpha,\beta$-ethylenic unsaturated group, or the like. Possible examples of a monomer having an $\alpha,\beta$-ethylenic unsaturated group include: acrylic acid, methacrylic acid, crotonic acid, itaconic acid, an itaconic acid monoester, malleinic acid, a malleinic acid monoester, fumaric acid, a fumaric acid monoester, vinyl sulfonic acid, styrene sulfonic acid, sulfonated vinyl naphthalene, vinyl alcohol, acryl amide, methacryloxy ethyl phosphate, bis-methacryloxy ethyl phosphate, methacryloxy ethyl phenyl acid phosphate, ethylene glycol dimethacrylate, diethylene glycol dimethacrylate, styrene, or a styrene derivative such as α-methyl styrene, or vinyl toluene; vinyl cyclohexane, vinyl naphthalene, a vinyl naphthalene derivative, an alkyl ester of acrylic acid, a phenyl ester of acrylic acid, an alkyl ester of methacrylic acid, a phenyl ester of methacrylic acid, a cycloalkyl ester of methacrylic acid, an alkyl ester of crotonic acid, a dialkyl ester of itaconic acid, a dialkyl ester of malleinic acid, and the like.

A copolymer obtained by copolymerizing one or a plurality of the above-described monomers having an α,β-ethylenic unsaturated group can be used as a polymer dispersant. Possible examples of same include: a styrene—styrene sulfonic acid copolymer, a styrene—malleinic acid copolymer, a styrene—methacrylic acid copolymer, a styrene—acrylic acid copolymer, a vinyl naphthalene—malleinic acid copolymer, a vinyl naphthalene—methacrylicacid copolymer, a vinyl naphthalene—acrylic acid copolymer, a copolymer of acrylic acid—alkyl ester of acrylic acid, a copolymer of methacrylic acid—alkyl ester of methacrylic acid, a copolymer of styrene—alkyl ester of methacrylic acid—methacrylic acid, a copolymer of styrene—alkyl ester of acrylic acid—acrylic acid, a copolymer of styrene—phenyl ester of methacrylic acid—methacrylic acid, and a copolymer of styrene—cyclohexyl ester of methacrylic acid—methacrylic acid.

Desirably, the polymer dispersant used in the present invention has a weight average molecular weight of 2,000 to 15,000. If the molecular weight of the polymer dispersant is less than 2,000, then there may be cases where the pigment is not dispersed stably, whereas if the molecular weight exceeds 15,000, then there may be cases where the viscosity of the liquid increases and ejection characteristics deteriorate. A more desirable weight average molecular weight is 3,500 to 10,000.

The polymer dispersant added to the liquid is used in the range of 0.01 wt % to 3 wt %, both inclusive. If the added content of polymer dispersant exceeds 3 wt %, then there may be cases where the liquid viscosity rises, and the ejection characteristics of the liquid becomes instable. On the other hand, if the added content is less than 0.01 wt %, then the dispersion stability of the pigment may decline. The added content of polymer dispersant is desirably between 0.05 wt % and 2.5 wt %, both inclusive, and more desirably, between 0.1 wt % and 2 wt %, both inclusive.

The aqueous solvent used in the present invention may be a multivalent alcohol, a derivative of a multivalent alcohol, a nitrous solvent, an alcohol, a sulfurous solvent, or the like. Specific examples of polyhydric alcohols include: ethylene glycol, diethylene glycol, propylene glycol, butylene glycol, triethylene glycol, 1,5-pentane diol, 1,2,6-hexane triol, glycerine, and the like. Specific examples of a derivative of a polyhydric alcohol include: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, an ethylene oxide addition product of diglycerine, and the like. Examples of a nitrous solvent include: pyrrolidone, N-methyl-2-pyrrolidone, cyclohexyl pyrrolidone, triethanol amine, and the like. Examples of an alcohol include: ethanol, isopropyl alcohol, butyl alcohol, benzyl alcohol, and the like. Examples of a sulfurous solvent include: thio diethanol, thio diglycerol, sulfolane, dimethyl sulfoxide, and the like. Apart from these, it is also possible to use propylene carbonate, ethylene carbonate, or the like.

The water-soluble solvent used in the present invention may be used independently, or two or more types of solvent may be mixed and used together. The water-soluble organic solvent is used in a content range of 1 wt % to 60 wt %, both inclusive, and desirably, a range of 5 wt % to 40 wt %, both inclusive. If the content of the water-soluble organic solvent in the liquid was less than 1 wt %, then there was a possibility that adequate optical density was not achieved, and if, conversely, the content of the solvent was greater than 60 wt %, then there was a case where the viscosity of the liquid rose and the ejection characteristics of the liquid became instable.

Desirably, the surface tension of the first liquid is equal to or greater than 20 mN/m and equal to or less than 60 mN/m. More desirably, it is equal to or greater than 20 mN/m and equal to or less than 45 mN/m, and even more desirably, it is equal to or greater than 25 mN/m and equal to or less than 40 mN/m. If the surface tension is less than 20 mN/m, then the liquid may flow out onto the nozzle surface, making it impossible to perform a correct printing operation. If, on the other hand, the surface tension exceeds 60 mN/m, then permeability is slow and the drying time may become long.

The viscosity of the first liquid is desirably equal to or greater than 1.2 mPa·s and equal to or less than 13.0 mPa·s, and more desirably, equal to or greater than 2 mPa·s and less than 11 mPa·s, and even more desirably, equal to or greater than 2.5 mPa·s and less than 9 mPa·s.

Water is added within the aforementioned ranges of the surface tension and the viscosity. There are no particular restrictions on the added amount of water, but desirably, it is equal to or greater than 10 wt % and equal to or less than 99 wt % with respect to the total amount of the first liquid, and more desirably, equal to or greater than 30 wt % and equal to or less than 80 wt %.

Next, the second liquid containing a liquid composition which enhancing printing characteristics is described below.

Second Liquid

A desirable example of a liquid composition which enhances the printing characteristics used in the present embodiment is a liquid composition which causes the pigment particles contained in the first liquid to agglomerate, thus generating an aggregate, by changing the pH of the ink. In this case, desirably, the pH of the liquid composition is 1 to 6, and more desirably, the pH is 2 to 5, and particularly desirably, the pH is 3 to 5. Desirably, the component of the liquid composition is selected from: polyacrylic acid, acetic acid, glycolic acid, malonic acid, malic acid, malleinic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, cumaric acid, thiophene carboxylic acid, nicotinic acid, and derivatives of these compounds, and salts of same, and the like.

One of these compounds may be used alone, or two or more of these compounds may be used in combination.

Furthermore, a desirable example of a liquid composition which is used to enhance the printing characteristics in the present embodiment is, for instance, a treatment liquid to which polyvalent metallic salt or polyarylamine has been added. Possible examples of the components of this liquid composition include: an alkali earth metal of group 2A of the periodic table (for example, magnesium or calcium), as the polyvalent metallic salt; a transition metal of group 3B of the periodic table (for example, lanthanum); a cation belonging to group 3A of the periodic table (for example, aluminum); a lanthanide (for example, neodymium); and polyarylamine, a polyarylamine derivative, and the like. Desirable examples are calcium and magnesium, for instance. Possible examples of anions which are used preferably by bonding with calcium or magnesium include: a carboxylic acid salt, a nitric acid salt, a chloride, an acetic acid salt, a benzoic acid salt, a formic acid salt, and a thiocyanic acid salt. Desirably, the carboxylic acid salt is derived from a saturated aliphatic monocarboxylic acid having 1 to 6 carbon atoms, or a carbocyclic monocarboxylic acid having 7 to 11 carbon atoms. Desirable examples of a saturated aliphatic monocarboxylic acid having 1 to 6 carbon atoms include: formic acid, acetic acid, propionic acid, butyric acid, isobutyric acid, valeric acid, isovaleric acid, pivalic acid, hexanoic acid, and the like. Formic acid and acetic acid are particularly desirable. With regard to the amount of the salt added to the treatment liquid, it is possible to add the salt to the treatment liquid at a rate of approximately 1 to approximately 10 wt %, and desirably, approximately 1.5 to approximately 7 wt %, and more desirably, approximately 2 to approximately 6 wt %.

Furthermore, a desirable example is one where the first liquid and the second liquid contain polymer micro-particles having a glass transition temperature Tg equal to or greater than 30° C. Desirably, the polymer micro-particles are dispersed as a polymer latex in water and a hydrous organic solvent.

For the polymer latex used in the present embodiment, it is possible to use various types of latex, such as a styrene latex, an acrylic latex, or a vinyl acetate latex, and a styrene latex is particularly desirable. Desirably, the styrene latex is a latex of a styrene—butadiene copolymer or a styrene—isoprene copolymer, and more desirably, it is a styrene—butadiene copolymer, which may be applied onto art paper or coated paper.

The weight ratio of the styrene monomer unit and the butadiene monomer unit in the styrene butadiene copolymer is desirably 20:80 to 95:5, more desirably, 30:70 to 80:20, and even more desirably, 30:70 to 55:45.

Furthermore, desirably, the ratio of the whole of the copolymer that is occupied by the styrene monomer unit and butadiene monomer unit is 60 to 99 wt %.

Moreover, the polymer latex used in the present embodiment may be obtained by copolymerizing monomers other than styrene and butadiene, and the monomers for copolymerization may be any monomers that can be copolymerized, such as a styrene having a substituent group, acrylic acid, methacrylic acid, and esters or amides of these, and the like.

In this polymer latex, it is desirable to use acrylic acid, methacrylic acid, an acrylic acid ester, a methacrylic acid ester, or acrylamide 2-methyl propane sulfonate, and more desirably, acrylic acid, methacrylic acid or acrylamide 2-methyl propane sulfonate, and even more desirably, acrylic acid or methacrylic acid.

Moreover, desirably, the acrylic acid or the methacrylic acid is contained at a rate of 1 to 6 wt %, and more desirably, 2 to 5 wt %, with respect to the sum of the styrene and butadiene. Desirably, these polymer latexes contain acrylic acid.

Possible examples of a latex of a styrene—butadiene—acrylic acid copolymer used preferably in the present embodiment include the commercial products such as LAC-STAR-3307B or 7132C (manufactured by Dai-Nippon Ink and Chemicals, Inc.), Nipol Lx416 (manufactured by Zeon Corp. Japan), Nalster SBR (manufactured by Nippon A & L Inc.), and the like.

If the added amount of the polymer micro-particles with respect to the first liquid, in other words, the ink, is large, then this has significant beneficial effects in improving fixing characteristics and wear resistance, but on the other hand, it also causes the viscosity to rise. Consequently, the added amount of polymer micro-particles is desirably 0.5 to 20 wt %, more desirably, 1 to 20 wt %, even more desirably 3 to 20 wt %, and yet more desirably, 5 to 15 wt %, with respect to the ink.

Accordingly, if it is necessary to increase the added amount of the polymer micro-particles beyond this, then desirably, polymer micro-particles are added to the treatment liquid, in other words, the second liquid, also. The desirable content of the polymer micro-particles in the treatment liquid is the same as it is in the case of ink.

Moreover, the glass transition temperature Tg of the polymer micro-particles used in the present embodiment is calculated by using the following formula.

$$1/Tg = \Sigma(Xi/Tgi) \quad \text{Formula 1}$$

Here, it is supposed that the polymer micro-particles are formed by copolymerizing n monomer components, from i=1 to i=n. Xi is the weight fraction of the ith monomer ($\Sigma Xi=1$), and Tgi is the glass transition temperature (absolute temperature) of the homopolymer of the ith monomer. Here, $\Sigma$ represents the sum for i=1 to n. By referring to the values given in the Polymer Handbook ($3^{rd}$ Edition) (J. Brandrup, E. H. Immergut, (Wiley—Interscience, 1989)), the value (Tgi) of the glass transition temperature of the homopolymer of the respective monomers was calculated to be 100° C. in the case of styrene and −85° C. in the case of butadiene. Therefore, even if the types of constituent monomer are the same, it is still possible to control the value of Tg by altering the compositional ratio of these monomers.

Desirably, from the viewpoint of the storage stability of the ink, the glass transition temperature Tg of the polymer micro-particles used in the present embodiment is room temperature or above, in other words, 30° C. or above. Furthermore, more desirably, the glass transition temperature Tg is 40° C. or above, and especially desirably, 50° C. or above. Drawbacks such as stickiness of the print sample can be envisaged in the case of a high glass transition temperature Tg, but by heating after printing, it is possible to minimize problems of stickiness and the like, even when using polymer micro-particles having a high glass transition temperature Tg.

Moreover, desirably, the average particle size of the polymer micro-particles is in the range of 10 nm to 1 μm, more desirably the range of 10 to 500 nm, even more desirably the range of 20 to 200 nm, and particularly desirably the range of 50 to 200 nm. Furthermore, there are no particular restrictions on the particle size distribution of the polymer particles and they may have a broad particle size distribution or they may have a monodisperse particle size distribution. Moreover, it is also possible to use a mixture of two or more types of polymer micro-particles having a monodisperse particle size distribution.

Furthermore, the first liquid and the second liquid according to the present invention may contain other additives, provided that they do not impede the beneficial effects of the present invention. The other additive may be, for example, a commonly known additive, such as an anti-drying agent (moisturizing agent), a permeation promoter, an ultraviolet absorber, an anti-fading agent, an antibacterial agent, a pH adjuster, a surface tension adjuster, an emulsion stabilizer, a preservative, an antifoaming agent, a viscosity adjuster, a dispersant, a dispersion stabilizer, an anti-rusting agent, a chelating agent, or the like. Furthermore, it is also possible to increase the content of the polymer micro-particles in the whole ink set, by including the polymer micro-particles described above in the treatment liquid.

An anti-drying agent is used appropriately for the purpose of preventing blockages due to drying of the inkjet ink in the ink spray ports of the nozzles used in an inkjet recording method. Preferably, the anti-drying agent is a water-soluble organic solvent having a lower vapor pressure than water. More specific examples of the anti-drying agent include the water-soluble solvent described above. The anti-drying agent described above may be used alone, or two or more types of anti-drying agent may be used together in combination. Desirably, the content of these anti-drying agents in the ink is 10 to 50 wt %.

A permeation promoter is used, as appropriate, in order to make the inkjet ink permeate more readily into the paper. For the permeation promoter, it is possible to use an alcohol, such as ethanol, isopropanol, butanol, di(tri)ethylene glycol monobutyl ether, 1,2-hexanediol, or the like, or sodium lauryl sulfate, sodium oleate, a nonionic surface active agent, or the like. In general, these materials display sufficient effects when contained at a rate of 5 to 30 wt % in the ink. Preferably, a permeation promoter is added in an amount which prevents print bleeding or print-through effects.

An ultraviolet absorber is used in order to improve image conservation. For the ultraviolet absorber, it is possible to use; a benzotriazole compound as described in Japanese Patent Application Publication Nos. 58-185677, 61-190537, 2-782, 5-197075, and 9-34057, and the like; a benzophenone compound as described in Japanese Patent Application Publication Nos. 46-2784 and 5-194483, and U.S. Pat. No. 3,214,463, and the like; a cinnamic acid compound as described in Japanese Patent Application Publication Nos. 48-30492, 56-21141, and 10-88106, and the like; a triazine compound as described in Japanese Patent Application Publication Nos. 4-298503, 8-53427, 8-239368, 10-182621, and 8-501291, and the like; a compound as described in Research Disclosure No. 24239; or a so-called fluorescent brightening agent, which is a compound that absorbs ultraviolet light and generates fluorescent light, typical examples being a stilbene or a benzoxazole compound.

An anti-fading agent is used in order to improve image conservation. For the anti-fading agent, it is possible to use various types of organic or metallic complex anti-fading agents. The organic type of the anti-fading agent may be a hydroquinone, an alkoxyphenol, a dialkoxyphenol, a phenol, an aniline, an amine, an indane, a chromane, an alkoxyaniline, a heterocyclic compound, or the like. The metallic complex type of the anti-fading agent may be a nickel complex, a zinc complex, or the like. More specifically, it is possible to use a compound as described in the patents cited in Research Disclosure Nos. 17643 (volume VII, sections I to J), 15162, 18716 (p. 650, left-hand column), 36544 (p. 527), 307105 (p. 872), or 15162, or a compound included in the general formulae and examples of typical compounds described in Japanese Patent Application Publication No. 62-215272, pages 127 to 137.

Examples of an anti-rusting agent include: sodium dehydroacetate, sodium benzoate, sodium pyridine thione-1-oxide, p-hydroxybenzoate ethyl ester, 1,2-benzisothiazoline-3-one, or a salt thereof, or the like. It is desirable to use these materials at a concentration of 0.02 to 1.00 wt % in the ink.

For the pH adjuster, it is possible to use the neutralizing agent (an organic salt, inorganic alkali). In order to improve storage stability of the ink for inkjet recording, the pH adjuster is added desirably in such a manner that the ink reaches a pH of 6 to 10, and more desirably, in such a manner that the ink reaches a pH of 7 to 10.

The surface tension adjuster is, for example, a nonionic, cationic, anionic or betaine type surface active agent. In order that droplets can be ejected satisfactorily in an inkjet apparatus, the added amount of the surface tension adjuster is, desirably, an amount which adjusts the surface tension of the ink to 20 to 60 mN/m, and more desirably, 20 to 45 mN/m, and even more desirably, 25 to 40 mN/m. In this case, a hydrocarbon type of the surface active agent may be used, for instance. The hydrocarbon type of the surface active agent includes: an anionic surface active agent such as a fatty acid salt, an alkyl sulfate ester salt, an alkyl benzene sulfonate salt, an alkyl naphthalene sulfonate salt, a dialkyl sulfosuccinate salt, an alkyl phosphate ester salt, a condensation product of naphthalene sulfonate with formalin, a polyoxyethylene alkyl sulfonate ester salt, or the like; or a nonionic surface active agent, such as a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylene alkyl amine, a glycerine fatty acid ester, an oxyethylene oxypropylene block copolymer, and the like. It is also desirable to use SURFYNOLS (Air Products & Chemicals Co. Ltd.), which is an acetylene-based polyoxyethylene oxide surface active agent. An amine oxide type of amphoteric surface active agent, such as N,N-dimethyl-N-alkyl amine oxide, is also desirable. Moreover, it is also possible to use the surface active agents cited in Japanese Patent Application Publication No. 59-157636, pages 37 and 38, and Research Disclosure No. 308119 (1989). Furthermore, it is also possible to use a fluorine (alkyl fluoride) type, or silicon type of surface active agent such as those described in Japanese Patent Application Publication Nos. 2003-322926, 2004-325707, and 2004-309806. It is also possible to use a surface tension adjuster of this kind as an anti-foaming agent; and a fluoride or silicone compound, or a chelating agent, such as EDTA, can also be used.

The ink for inkjet recording according to the present invention can be used for forming full-color images. In order to form a full-color image, it is possible to use a magenta-toned ink, a cyan-toned ink, and a yellow-toned ink; a black-toned ink may also be used in order to adjust the color tones. Furthermore, besides the yellow, magenta and cyan-toned inks, it is also possible to use red, green, blue or white inks, or so-called special colored inks used in the field of printing.

In the image recording method according to the present invention, energy is applied to the ink set for inkjet recording described above, in order to form an image on a commonly known receiving material, in other words, normal paper or resin-coated paper, such as the inkjet paper, a film, electrophotographic paper, cloth, glass, metal, or ceramic, which is described, for example, in Japanese Patent Application Publication No. 8-169172, Japanese Patent Application Publication No. 8-27693, Japanese Patent Application Publication No. 2-276670, Japanese Patent Application Publication No. 7-276789, Japanese Patent Application Publication No. 9-323475, Japanese Patent Application Publication No. 62-238783, Japanese Patent Application Publication No. 10-153989, Japanese Patent Application Publication No. 10-217473, Japanese Patent Application Publication No. 10-235995, Japanese Patent Application Publication No. 10-337947, Japanese Patent Application Publication No. 10-217597, Japanese Patent Application Publication No. 10-337947, or the like. It is possible to adopt the method described in paragraphs 0093 to 0105 of Japanese Patent Application Publication No. 2003-306623 as the inkjet recording method according to the present invention.

When forming an image, from the viewpoint of imparting glossiness and waterproofing characteristics, and improving weatherproofing, it is possible to combine use of a polymer latex compound. With regard to the timing at which the latex compound is applied to the receiving medium, it may be applied before, after or at the same time as applying the coloring material, and therefore it may be added to the image receiving paper or the ink, or it may be used in the form of an independent polymer latex liquid. More specifically, it is desirable to use a method as described in Japanese Patent Application Publication No. 2002-166638 (Japanese Patent Application No. 2000-363090), Japanese Patent Application Publication No. 2002-121440 (Japanese Patent Application No. 2000-315231), Japanese Patent Application Publication No. 2002-154201 (Japanese Patent Application No. 2000-354380), Japanese Patent Application Publication No. 2002-144696 (Japanese Patent Application No. 2000-343944), or Japanese Patent Application Publication No. 2002-080759 (Japanese Patent Application No. 2000-268952).

General Composition of Inkjet Recording Apparatus

Next, an image recording apparatus which uses the ink set for inkjet recording described above is explained below.

General Composition of Inkjet Recording Apparatus

FIG. 1 is a general schematic drawing showing an inkjet recording apparatus forming one mode of an image forming apparatus according to an embodiment of the present invention. As shown in FIG. 1, this inkjet recording apparatus 10 comprises: a treatment liquid head (corresponding to a treatment liquid application device) 11 for ejecting treatment liquid; a print unit 12 having a plurality of print heads (corresponding to ink liquid ejection devices) 12K, 12C, 12M and 12Y, provided corresponding to respective colors, in order to eject inks of respective colors, namely, black (K), cyan (C), magenta (M), and yellow (Y); a treatment liquid storing and loading unit 13 which stores treatment liquid (second liquid) for supply to the treatment liquid head 11; an ink storing and loading unit 14 which stores colored inks (first liquid) for supply to the print heads 12K, 12C, 12M and 12Y; a solvent-absorbing roller (corresponding to a solvent absorbing device) 15, disposed after the print unit 12; a medium supply unit 18 which supplies a recording medium 16; a decurling unit 20 which removes curl from the recording medium 16; a suction belt conveyance unit (corresponding to a conveyance device) 22, disposed in opposition to the nozzle surfaces (liquid ejection surfaces) of the treatment liquid head 11 and the print unit 12, which conveys the recording medium 16 while keeping the recording medium 16 flat; and a print output unit 26 which outputs recorded recording medium 16 (printed matter) to the exterior.

As regards the supply system for the recording medium 16, in FIG. 1, a magazine 19 for rolled paper (continuous paper) is shown as an example of the medium supply unit 18; however, a plurality of magazines with papers of different paper width and quality may be jointly provided. Moreover, papers may be supplied in cassettes that contain cut papers loaded in layers and that are used jointly or in lieu of magazines for rolled papers.

In the case of a configuration in which a plurality of types of recording medium can be used, it is preferable that an information recording medium such as a bar code and a wireless tag containing information about the type of recording medium is attached to the magazine, and by reading the information contained in the information recording medium with a predetermined reading device, the type of recording medium (media type) to be used is automatically determined, and ejection is controlled so that the treatment liquid and ink are ejected in an appropriate manner depending on the type of medium.

The recording medium 16 delivered from the medium supply unit 18 retains curl due to having been loaded in the magazine 19. In order to remove the curl, heat is applied to the recording medium 16 in the decurling unit 20 by a heating drum 30 in the direction opposite to the curl direction in the magazine. In this case, the heating temperature is preferably controlled in such a manner that the medium has a curl in which the surface on which the print is to be made is slightly rounded in the outward direction.

In the case of the configuration in which roll paper is used, a cutter (a first cutter) 28 is provided as shown in FIG. 1, and the continuous paper is cut to a desired size by the cutter 28. When cut paper is used, the cutter 28 is not required.

After decurling in the decurling unit 24, the cut recording medium 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the print unit 12 forms a horizontal plane (flat plane).

The belt 33 has a width that is greater than the width of the recording medium 16, and a plurality of suction apertures (not shown) are formed on the belt surface. A suction chamber 34 is disposed in a position facing the nozzle surface of the print unit 12 on the interior side of the belt 33 which is set around the rollers 31 and 32; and the suction chamber 34 provides suction with a fan 35 to generate a negative pressure, thereby holding the recording medium 16 onto the belt 33 by suction.

The belt 33 is driven in the counterclockwise direction in FIG. 1 by the motive force of a motor (indicated by reference numeral 88 in FIG. 7) being transmitted to at least one of the rollers 31 and 32, which the belt 33 is set around, and the recording medium 16 held on the belt 33 is conveyed from right to left in FIG. 1.

Instead of the suction belt conveyance unit 22, it might also be possible to use a roller nip conveyance mechanism. However, since the print region passes through the roller nip, the printed surface of the paper makes contact with the rollers immediately after printing, and hence smearing of the image is liable to occur. Therefore, a suction belt conveyance mechanism in which nothing comes into contact with the image surface in the printing area is preferable. The attraction method is not limited to attraction by suction (vacuum attraction) as described above, and a method based on electrostatic attraction may also be used.

Since ink adheres to the belt 33 when a marginless print job or the like is performed, a belt cleaning unit 36 is disposed in a predetermined position (a suitable position outside the printing area) on the exterior side of the belt 33. Although the details of the configuration of the belt cleaning unit 36 are not shown, examples thereof may include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the linear velocity of the cleaning roller different to that of the belt 33, in order to improve the cleaning effect.

The treatment liquid head 11 and the print heads 12K, 12M, 12C and 12Y are full line heads having a length corresponding to the maximum width of the recording medium 16 used with the inkjet recording apparatus 10 (see FIGS. 2A and 2B), and comprising nozzles for ejecting ink or nozzles for ejecting treatment liquid arranged on a nozzle face through a length exceeding at least one edge of the maximum-size recording paper (the full width of the printable range).

As shown in FIG. 1, the heads 12K, 12C, 12M and 12Y of the print unit 12 are arranged in the sequence of the colors, black (K), cyan (C), magenta (M) and yellow (Y), from the upstream side, in the direction of conveyance of the recording medium 16, and the treatment liquid head 11 is disposed to the upstream side with respect to the print unit 12 (before the print unit 12). The heads 11, 12K, 12C, 12M and 12Y are disposed in fixed positions in such a manner that they extend in a direction substantially perpendicular to the conveyance direction of the recording medium 16.

By means of this head arrangement, it is possible to apply a treatment liquid to the recording surface (print surface) of the recording medium 16 by the treatment liquid head 11, before ejecting droplets of colored inks from the print unit 12. Furthermore, a color image can be formed on the recording medium 16 by ejecting inks of different colors from the print heads 12K, 12C, 12M, and 12Y, respectively, onto the recording medium 16 to which the treatment liquid has been applied, while the recording medium 16 is conveyed by means of the suction belt conveyance unit 22. At this time, the treatment liquid that has been applied on the recording medium 16 and the ink liquid that is being applied on the recording medium 16 react with each other on the recording medium 16 to form aggregate.

By adopting a configuration in which a full line treatment liquid head 11 and full line heads 12K, 12C, 12M and 12Y having nozzle rows covering the full paper width are provided in this way, it is possible to record an image on the full surface of the recording medium 16 by performing just one operation of relatively moving the medium 16 and the print unit 12, in the paper conveyance direction (the sub-scanning direction), (in other words, by means of one sub-scanning action). Higher-speed printing is thereby made possible and productivity can be improved in comparison with a shuttle type head configuration in which a recording head reciprocates in the main scanning direction.

Although the configuration with the KCMY four standard colors is described in the present embodiment, combinations of the ink colors and the number of colors are not limited to those. Light and/or dark inks and special color inks can be added as required. For example, a configuration is possible in which print heads for ejecting light-colored inks such as light cyan and light magenta are added. Furthermore, there are no particular restrictions of the sequence in which the heads of respective colors are arranged.

The treatment liquid storing and loading unit 13 has a treatment liquid tank for storing treatment liquid, and the tank is connected to the treatment liquid head 11 via necessary tubing channels. The treatment liquid supplied from the treatment liquid tank is ejected in the form of droplets from the treatment liquid head 11. The treatment liquid storing and loading unit 13 has a reporting device (display device, alarm sound generating device) for issuing a report when the remaining amount of treatment liquid has become low.

The ink storing and loading unit 14 has ink tanks 14K, 14C, 14M, 14Y for storing the inks of the colors corresponding to the print heads 12K, 12C, 12M, and 12Y, and the tanks are connected to the print heads 12K, 12C, 12M, and 12Y through prescribed channels (not shown). The ink storing and loading unit 14 also comprises a warning device (for example, a display device and/or an alarm sound generator) for warning when the remaining amount of any ink is low, and has a mechanism for preventing loading errors among the colors.

The surface of the solvent absorbing roller 15 is made of a porous member 15A which has a length corresponding to the maximum width of the recording medium 16 used in the inkjet recording apparatus 10. The rotational axle 15B of the solvent absorbing roller 15 extends in a direction (main scanning direction) perpendicular to the conveyance direction of the recording medium 16. The solvent absorbing roller 15 supported rotatably on the rotational axle 15B can be rotated in accordance with the conveyance speed of the recording medium 16, in such a manner that the relative speed of the surface of the solvent absorbing roller 15 with respect to the recording medium 16 becomes zero. In this way, disturbance of the image due to rubbing of the ink is prevented.

The solvent absorbing roller 15 may achieve a length corresponding to the full width of the recording medium 16 by means of one (a single) long roller member, and may also achieve the required length by arranging a plurality of roller modules divided in a direction (main scanning direction) substantially perpendicular to the conveyance direction of the recording medium 16. Furthermore, it is possible to adopt a composition in which a plurality of rows of solvent absorbing rollers are disposed in line with the conveyance direction of the recording medium 16.

Although not shown in FIG. 1, an elevator mechanism for raising and lowering the solvent absorbing roller 15 with respect to the recording medium 16 is provided. By controlling the elevator mechanism in accordance with instructions from the system control system described hereinafter, the position of the solvent absorbing roller 15 (the relative position thereof in the direction perpendicular to the recording surface of the recording medium 16) can be adjusted. In this way, it is possible to alter the contact pressure between the solvent absorbing roller 15 and the recording medium 16, or the clearance between the solvent absorbing roller 15 and the recording medium 16. In the case of a composition having a plurality of roller modules, a desirable mode is one in which a mechanism for controlling the vertical position is provided with respect to each roller module.

By moving the recording medium 16 in the direction of conveyance while the solvent absorbing roller 15 is made to contact the ink on the recording medium 16, the solvent on the recording medium 16 (the solvent separated from the coloring material) is absorbed by the solvent absorbing roller 15 due to the capillary force of the porous member 15A. In the ink from which the excess solvent has been removed by the solvent absorbing roller 15 in this way, the coupling force between the coloring materials increases and the coloring materials become fixed onto the recording medium 16.

In the present embodiment, as a device for absorbing and removing the solvent, the solvent absorbing roller 15 including the porous member 15A is used. However, the form of the solvent absorbing device is not limited to being roller-form, and it may also be belt-form.

A heating unit 17 is further provided on the downstream side of the solvent absorbing roller 15, which absorbs and removes the major part of the solvent. This heating unit 17 blows a heated air having a prescribed temperature of around 30° C. or above, directly onto the recording medium 16, thereby causing the residual solvent in the aggregate on the recording medium 16 to evaporate further. Thereby, the polymer micro-particles in the aggregate dry and harden. Consequently, the coloring material becomes fixed in the form of a film onto the recording medium 16, and a print having excellent rubbing resistance, water resistance and fixing properties can be obtained.

In the example of a method of heating the aggregate described in the present embodiment, the coloring material is fixed by blowing a heated wind directly on the aggregate on the recording medium 16, but the invention is not limited to this method. For example, a method where heat is applied by means of a heater may also be adopted. Furthermore, in the present embodiment, the heating unit 17 is disposed on the downstream side of the solvent absorbing roller 15, but the invention is not limited to this, and provided that a composition capable of applying heat after the generation of the aggregate is achieved, then it may also be disposed on the upstream side of the solvent absorbing roller 15.

The printed matter generated in this manner (i.e., the resulting matter generated by printing) is outputted from the print output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to print output units 26A and 26B, respectively.

When the target print and the test print are simultaneously formed in parallel on the same large sheet of paper, the test print portion is cut and separated by a cutter (second cutter) 38. The cutter 38 is disposed in front of the print output unit 26, and is used for cutting the test print portion from the target print portion when a test print has been performed in the blank portion of the paper.

Structure of Print Head

Next, the structure of the print head will be described. The print heads 12K, 12C, 12M, and 12Y of the respective ink colors have the same structure, and a reference numeral 50 is hereinafter designated to any of the print heads.

Figure 2A:
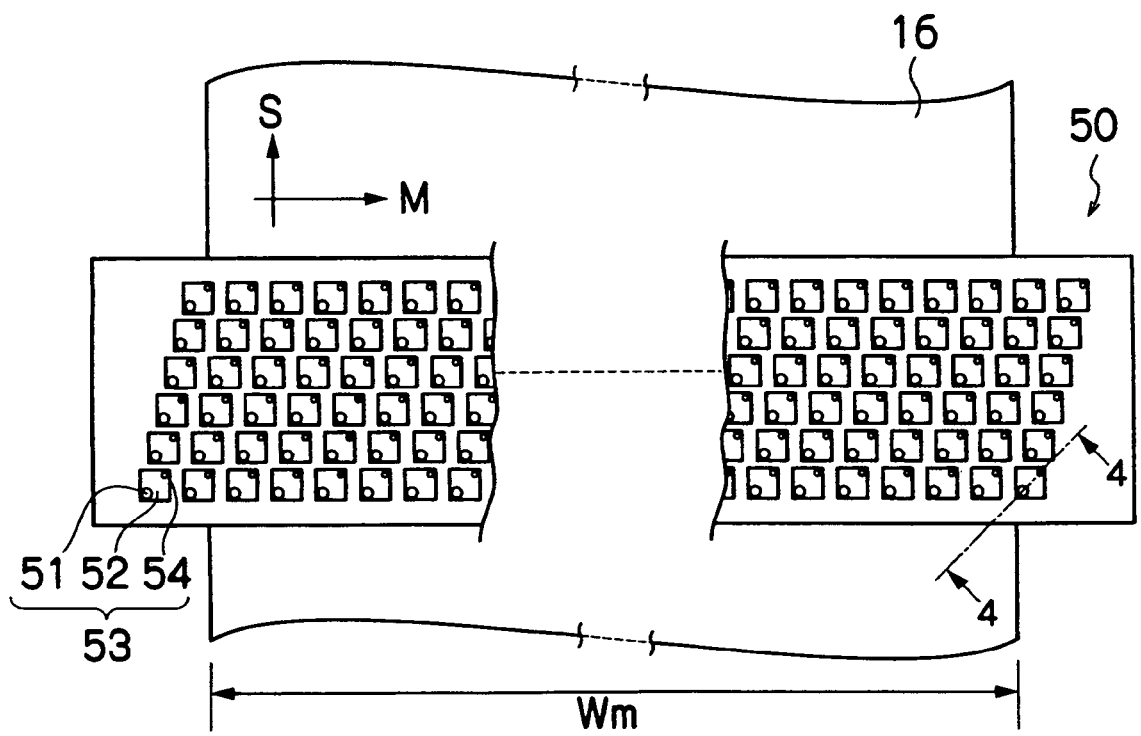
FIGS. 2A and 2B are plan view perspective diagrams showing a compositional example of a print head.
Figure 2B:
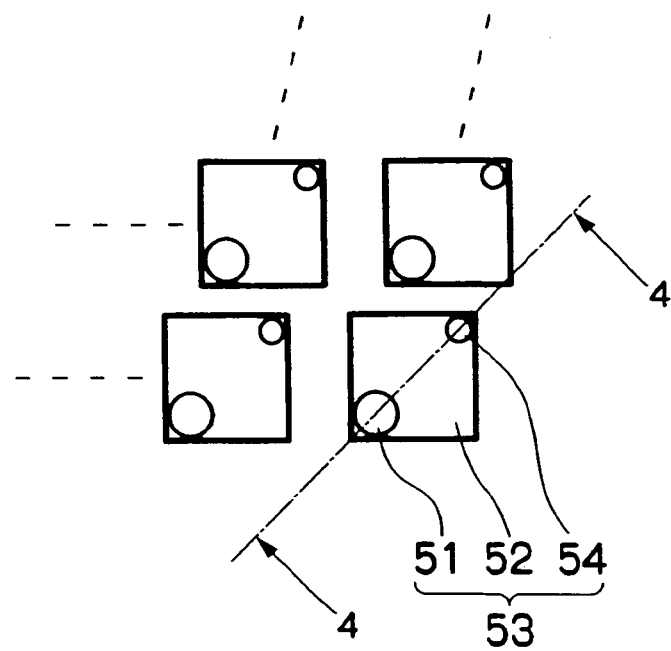
Figure 3:
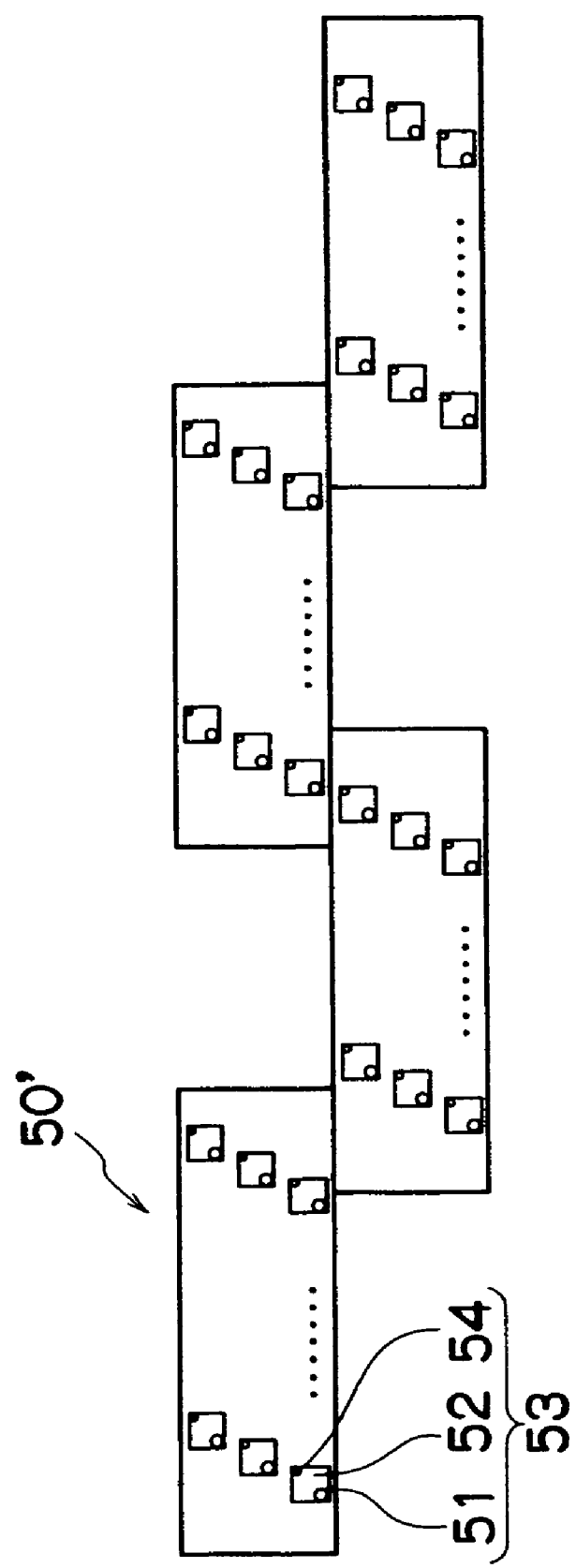
FIG. 3 is a plan view perspective diagram showing another compositional example of a full-line type print head.
Figure 4:
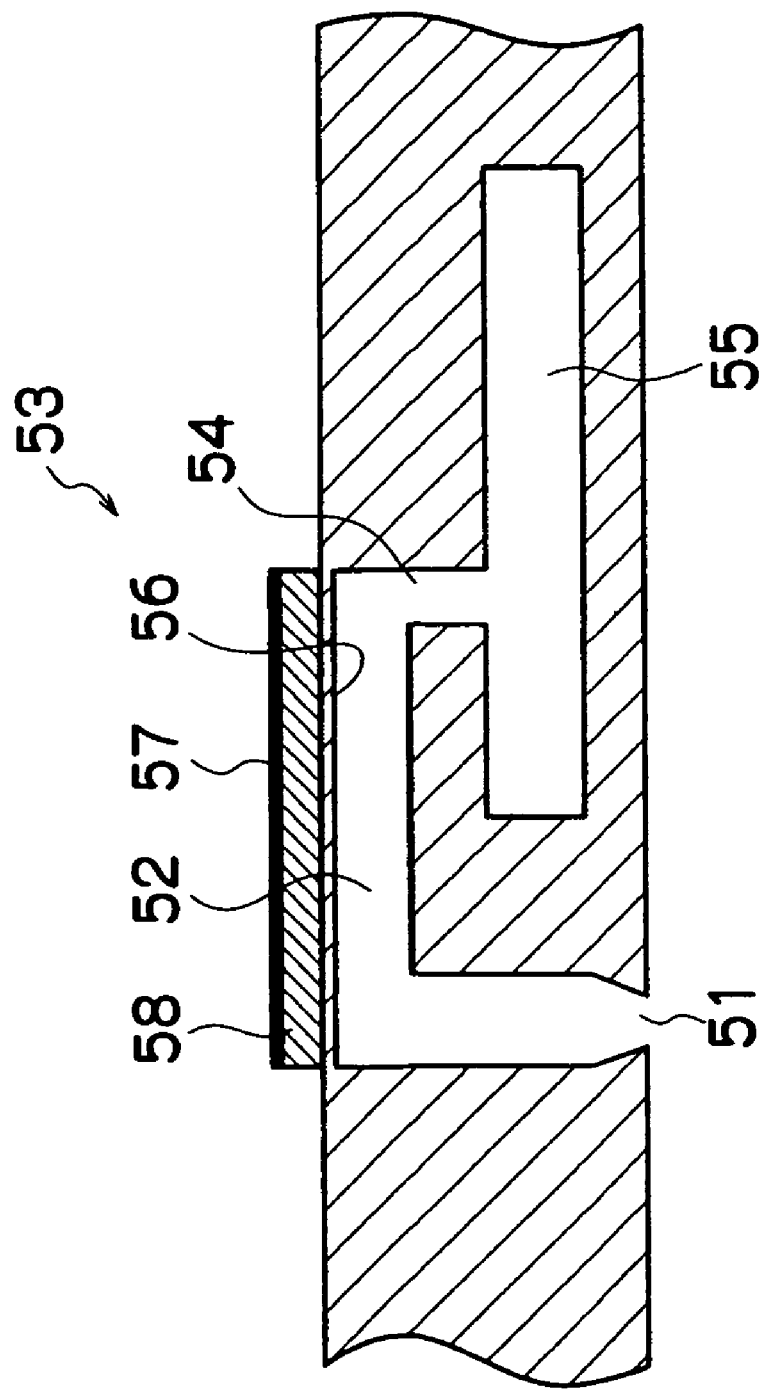
FIG. 4 is a cross-sectional diagram taken along line 4-4 in FIG. 2.

FIG. 2A is a perspective plan view showing an example of the configuration of the print head 50, FIG. 2B is an enlarged view of a portion thereof, FIG. 3 is a perspective plan view showing another example of the configuration of the print head 50, and FIG. 4 is a cross-sectional view taken along the line 4-4 in FIGS. 2A and 2B, showing the inner structure of a droplet ejection element (an ink chamber unit for one nozzle 51).

The nozzle pitch in the print head 50 is required to be minimized in order to maximize the density of the dots printed on the surface of the recording medium 16. As shown in FIGS. 2A and 2B, the print head 50 according to the present embodiment includes ink chamber units (droplet ejection elements) 53, each having a nozzle 51 forming an ink droplet ejection port, a pressure chamber 52 corresponding to the nozzle 51, and the like. The ink chamber units 53 are arranged two-dimensionally in the form of a staggered matrix. Hence, the effective nozzle interval (the projected nozzle pitch) resulting from the projection of the nozzles 51 so that the projected nozzles are arranged in the lengthwise direction of the head (the direction perpendicular to the paper conveyance direction) is reduced and high nozzle density is achieved.

The mode of forming one or more nozzle rows through a length corresponding to the entire width Wm of the recording medium 16 in a direction (direction of arrow M: main scanning direction) substantially perpendicular to the conveyance direction of the recording medium 16 (direction of arrow S: sub-scanning direction) is not limited to the examples described above. For example, instead of the configuration in FIG. 2A, as shown in FIG. 3, a line head having nozzle rows of a length corresponding to the entire width of the recording medium 16 can be formed by arranging and combining, in a staggered matrix, short head modules 50' having a plurality of nozzles 51 arrayed in a two-dimensional fashion.

As shown in FIGS. 2A and 2B, the planar shape of the pressure chamber 52 provided for each nozzle 51 is substantially a square, and an outlet to the nozzle 51 and an inlet of supplied ink (supply port) 54 are respectively disposed in both corners on a diagonal line of the square. The shape of the pressure chamber 52 is not limited to the above-mentioned example and various modes are possible in which the planar shape is a polygonal shape such as a quadrilateral shape (rhombic shape, rectangular shape, or the like), a pentagonal shape, and a hexagonal shape, a circular shape, elliptical shape, or the like.

As shown in FIG. 4, each pressure chamber 52 is connected to a common channel 55 through the supply port 54. The common channel 55 is connected to an ink tank 60 (not shown in FIG. 4, but shown in FIG. 6) which is a base tank that supplies ink. The ink supplied from the ink tank 60 is delivered through the common flow channel 55 in FIG. 4 to the pressure chambers 52.

An actuator 58 provided with an individual electrode 57 is bonded to a pressure plate (a diaphragm that also serves as a common electrode) 56 which forms one portion (in FIG. 4, the ceiling) of the pressure chamber 52. When a drive voltage is applied to the individual electrode 57 and the common electrode, the actuator 58 deforms, thereby changing the volume of the pressure chamber 52. This causes a pressure change resulting in ink being ejected from the nozzle 51. As the actuator 58, it is possible to use a piezoelectric element using a piezoelectric material, such as lead zirconate titanate, barium titanate, or the like. When the displacement of the actuator 58 is reduced and the actuator 58 returns to its original position after the ejecting ink, new ink is supplied to the pressure chamber 52 from the common channel 55 via the supply port 54.

Figure 5:
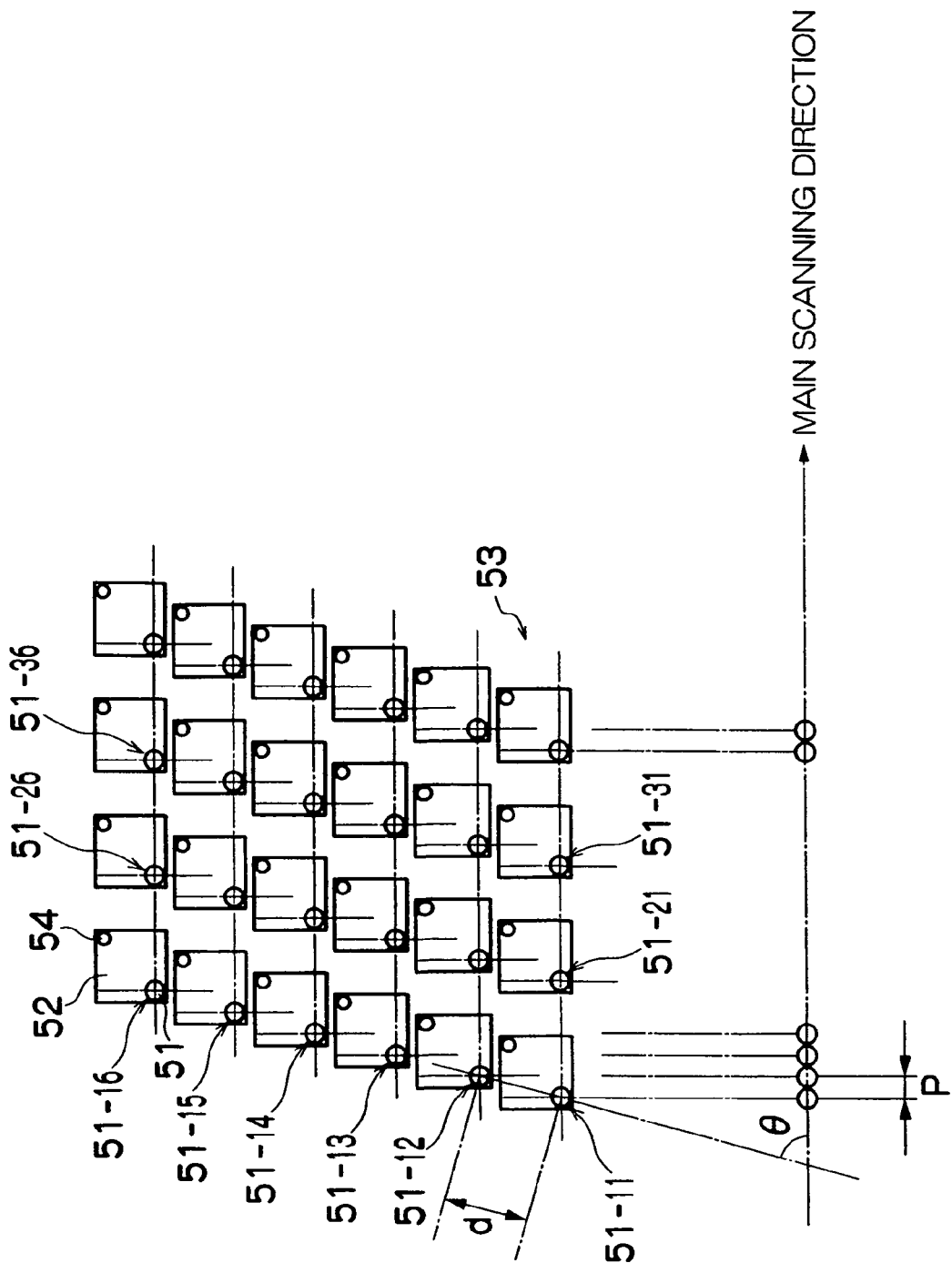
FIG. 5 is an enlarged diagram showing a nozzle arrangement of the print head shown in FIG. 2.

As shown in FIG. 5, the high-density nozzle head according to the present example is achieved by arranging a plurality of ink chamber units 53 having the above-described structure in a lattice fashion based on a fixed arrangement pattern, in a row direction which corresponds to the main scanning direction, and a column direction which is inclined at a fixed angle of $\theta$ with respect to the main scanning direction, rather than being perpendicular to the main scanning direction.

More specifically, by adopting a structure in which a plurality of ink chamber units 53 are arranged at a uniform pitch d in line with a direction forming an angle of $\theta$ with respect to the main scanning direction, the pitch P of the nozzles projected so as to align in the main scanning direction is $d \times \cos \theta$, and hence the nozzles 51 can be regarded to be equivalent to those arranged linearly at a fixed pitch P along the main scanning direction. With such configuration, it is possible to achieve a nozzle row with a high nozzle density.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, . . . , 51-26 are treated as another block; the nozzles 51-31, . . . , 51-36 are treated as another block; . . . ); and one line is printed in the width direction of the recording medium 16 by sequentially driving the nozzles 51-11, 51-12, . . . , 51-16 in accordance with the conveyance velocity of the recording medium 16.

On the other hand, "sub-scanning" is defined as to repeatedly perform printing of one line (a line formed of a row of dots, or a line formed of a plurality of rows of dots) formed by the main scanning, while the full-line head and the recording paper are moved relatively to each other.

The direction along one line (or the lengthwise direction of a band-shaped region) recorded by the main scanning as described above is called the "main scanning direction", and the direction in which the sub-scanning is performed, is called the "sub-scanning direction". In other words, in the present embodiment, the conveyance direction of the recording medium 16 is called the sub-scanning direction and the direction perpendicular to same is called the main scanning direction.

In implementing the present invention, the arrangement of the nozzles is not limited to that of the embodiment illustrated. Although a method is employed in the present embodiment where an ink droplet is ejected by means of the deformation of the actuator 58 typified by a piezoelectric element, the method used for discharging ink is not limited in particular in implementing the present invention. Instead of the piezo jet method, it is also possible to apply various types of methods, such as a thermal jet method where the ink is heated and bubbles are caused to form therein by means of a heat generating body including a heater, ink droplets being ejected by means of the pressure applied by these bubbles.

Although not shown here, the structure of the treatment liquid head 11 is approximately the same as the print head 50 described above. Since it is sufficient that the treatment liquid is applied to the recording medium 16 in a substantially uniform (even) fashion in the region where ink droplets are to be deposited, it is not necessary to form dots to a high density in comparison with the ink. Consequently, the treatment liquid head 11 may have a reduced number of nozzles (a reduced nozzle density) in comparison with the print head 50 for ejecting ink. Furthermore, a composition may also be adopted in which the nozzle diameter of the treatment liquid head 11 is greater than the nozzle diameter of the print head 50 for ejecting ink.

Configuration of Ink Supply System

Figure 6:
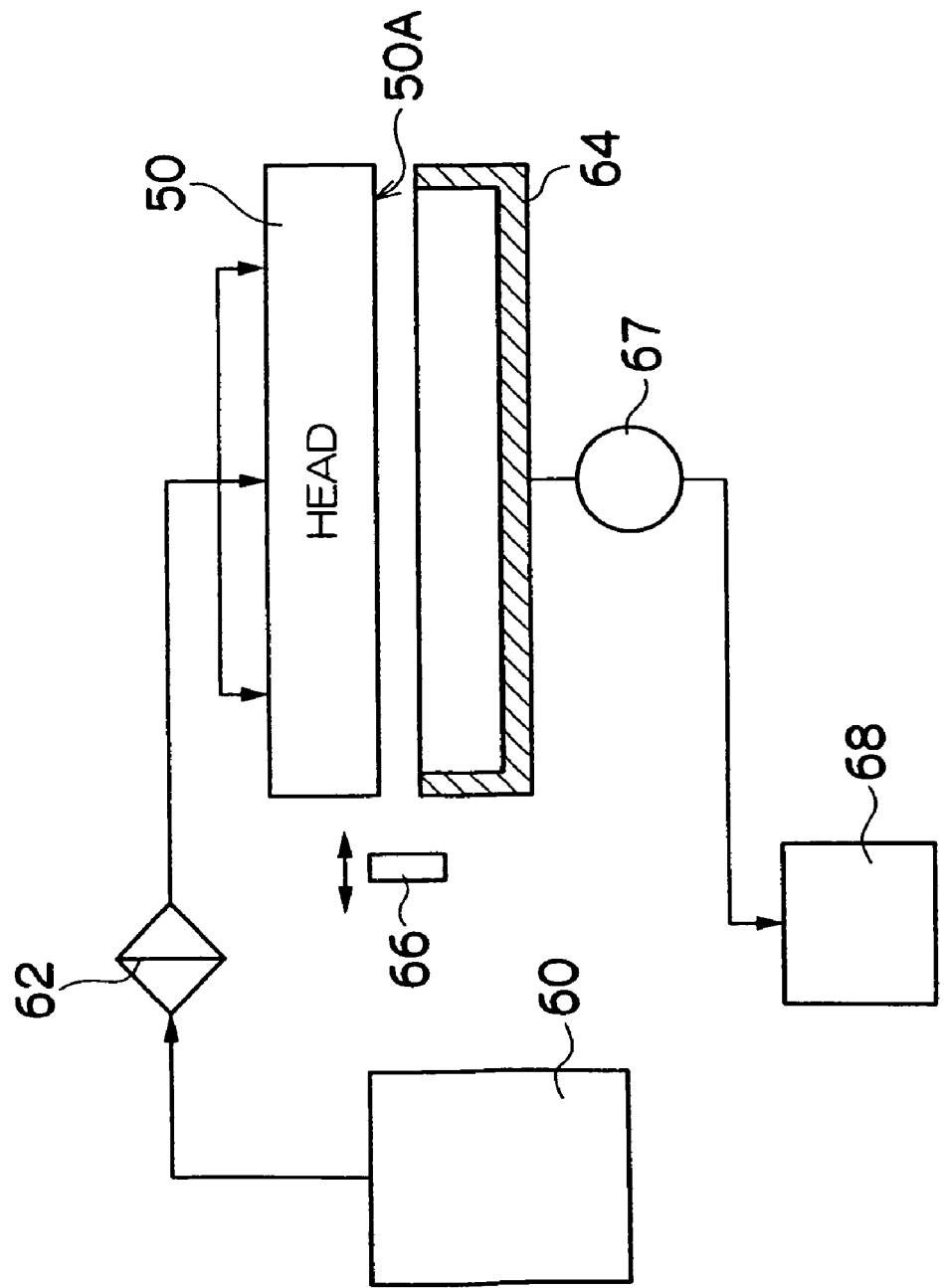
FIG. 6 is a general compositional diagram showing an ink supply system in the inkjet recording apparatus according to an embodiment of the present invention.

FIG. 6 is a schematic drawing showing the configuration of the ink supply system in the inkjet recording apparatus 10. The ink tank 60 is a base tank that supplies ink to the print head 50 and is set in the ink storing and loading unit 14 described with reference to FIG. 1. In other words, the ink supply tank 60 in FIG. 6 is equivalent to the ink storing and loading unit 14 in FIG. 1. The types of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In order to change the ink type depending on the intended application, the cartridge type is suitable, and it is preferable to represent the ink type information with a bar code or the like on the cartridge, and to perform ejection control depending on the ink type.

A filter 62 for removing foreign matters and bubbles is disposed between the ink tank 60 and the print head 50 as shown in FIG. 6. The filter mesh size in the filter 62 is preferably equivalent to or less than the diameter of the nozzle. Although not shown in FIG. 6, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a cap 64 as a device to prevent the nozzles 51 from drying out or to prevent an increase in the ink viscosity in the vicinity of the nozzles 51, and a cleaning blade 66 as a device to clean the nozzle face 50A. A maintenance unit (restoring device) including the cap 64 and the cleaning blade 66 can be relatively moved with respect to the print head 50 by a movement mechanism (not shown), and is moved from a predetermined holding position to a maintenance position below the print head 50 as required.

The cap 64 is displaced up and down relatively with respect to the print head 50 by an elevator mechanism (not shown). When the power of the inkjet recording apparatus 10 is turned OFF or when in a print standby state, the cap 64 is raised to a predetermined elevated position so as to come into close contact with the print head 50, and the nozzle face 50A is thereby covered with the cap 64.

The cleaning blade 66 is composed of rubber or another elastic member, and can slide on the nozzle surface 50A (surface of the nozzle plate) of the print head 50 by means of a blade movement mechanism (not shown). When ink droplets or foreign matter has adhered to the surface of the nozzle plate, the surface of the nozzle plate is wiped by sliding the cleaning blade 66 on the nozzle plate.

During printing or standby, when the frequency of use of specific nozzles is reduced and ink viscosity increases in the vicinity of the nozzles, a preliminary discharge is made to eject the degraded ink toward the cap 64 (also used as an ink receptor).

When a state in which ink is not ejected from the print head 50 continues for a certain amount of time or longer, the ink solvent in the vicinity of the nozzles 51 evaporates and ink viscosity increases. In such a state, ink can no longer be ejected from the nozzle 51 even if the actuator 58 for the ejection driving is operated. Before reaching such a state (i.e., during a state that the viscosity range of the ink allows the ink ejection by the operation of the actuator 58) the actuator 58 is operated to perform the preliminary discharge to eject the ink of which viscosity has increased in the vicinity of the nozzle toward the ink receptor. After the nozzle surface is cleaned by a wiper such as the cleaning blade 66 provided as the cleaning device for the nozzle face 50A, a preliminary discharge is also carried out in order to prevent the foreign matter from becoming mixed inside the nozzles 51 by the wiper sliding operation. The preliminary discharge is also referred to as "dummy discharge", "purge", "liquid discharge", and so on.

On the other hand, if air bubbles become intermixed into the nozzle 51 or pressure chamber 52, or if the rise in the viscosity of the ink inside the nozzle 51 exceeds a certain level, then it may not be possible to eject ink in the preliminary ejection operation described above. In cases of this kind, the cap 64 forming a suction device is pressed against the nozzle surface 50A of the print head 50, and the ink inside the pressure chambers 52 (namely, the ink containing air bubbles or the ink of increased viscosity) is suctioned by a suction pump 67. The ink suctioned and removed by means of this suction operation is sent to a recovery tank 68. The ink collected in the recovery tank 68 may be used, or may be discarded if it is impossible to reuse that.

Since the suctioning operation is performed with respect to all of the ink in the pressure chambers 52, it consumes a large amount of ink. Therefore, desirably, preliminary ejection is carried out while the increase in the viscosity of the ink is still minor. The suction operation is also carried out when ink is loaded into the print head 50 for the first time, and when the head starts to be used after being idle for a long period of time.

The supply system for the treatment liquid is not shown; however it is substantially the same as the composition of the ink supply system shown in FIG. 6.

Description of Control System

Figure 7:
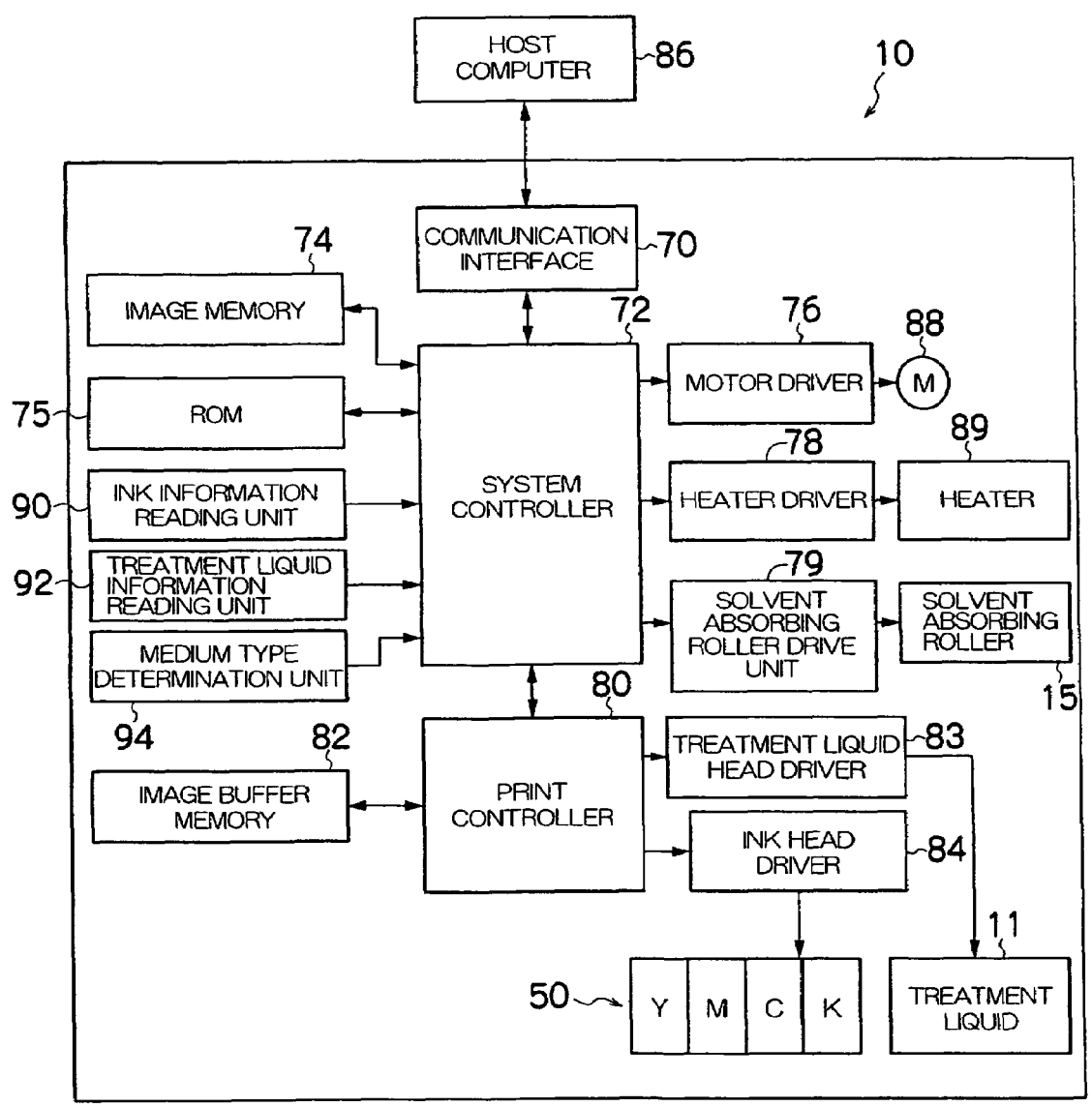
FIG. 7 is a principle block diagram showing system composition of the inkjet recording apparatus according to an embodiment of the present invention.

FIG. 7 is a principal block diagram showing the system configuration of the inkjet recording apparatus 10. The inkjet recording apparatus 10 comprises a communication interface 70, a system controller 72, an image memory 74, a ROM 75, a motor driver 76, a heater driver 78, a solvent absorbing roller drive unit 79, a print controller 80, an image buffer memory 82, a treatment liquid head driver 83, an ink head driver 84, and the like.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed.

The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used as the image memory.

The system controller 72 is constituted by a central processing unit (CPU) and peripheral circuits thereof, and the like, and it functions as a control device for controlling the whole of the inkjet recording apparatus 10 in accordance with a prescribed program, as well as a calculation device for performing various calculations. More specifically, the system controller 72 controls the various sections, such as the communication interface 70, image memory 74, motor driver 76, heater driver 78, and the like. The system controller 72 controls communications with the host computer 86, controls writing and reading to and from the image memory 74, and also generates control signals for controlling the motor 88 and heater 89 of the conveyance system.

The program executed by the CPU of the system controller 72 and the various types of data that are required for control procedures are stored in the ROM 75. The ROM 75 may be a non-writeable storage device, or it may be a rewriteable storage device, such as an EEPROM. The image memory 74 is used as a temporary storage region for the image data, and it is also used as a program development region and a calculation work region for the CPU.

The motor driver (drive circuit) 76 drives the motor 88 in accordance with commands from the system controller 72. The heater driver (drive circuit) 78 drives the heater 89 of the drying unit and the heating unit 17, and the like, in accordance with commands from the system controller 72.

The print controller 80 has a signal processing function for performing various tasks, compensations, and other types of processing for generating print control signals on the basis of the image data stored in the image memory 74 in accordance with commands from the system controller 72 so as to supply the generated print data (dot data) to the treatment liquid head driver 83 and the ink head driver 84.

The image buffer memory 82 is provided in the print controller, and image data, parameters, and other data are temporarily stored in the image buffer memory 82 when image data is processed in the print controller 80. In FIG. 7, the image buffer memory 82 is depicted as being attached to the print controller 80; however, the image memory 74 may also serve as the image buffer memory 82. Also possible is a mode in which the print controller 80 and the system controller 72 are integrated to form a single processor.

To give a general description of the sequence of processing from image input to print output, image data to be printed (original image data) is input from an external source via a communication interface 70, and is accumulated in the image memory 74. At this stage, RGB image data is stored in the image memory 74, for example.

In this inkjet recording apparatus 10, an image that appears to have a continuous tonal graduation to the human eye is formed by changing the dot density and the dot size of fine dots created by depositing droplets of the ink (coloring material). Therefore, it is necessary to convert the input digital image into a dot pattern that reproduces the tonal gradations of the image (namely, the light and shade toning of the image) as faithfully as possible. Hence, original image data (RGB data) stored in the image memory 74 is sent to the print controller 80 through the system controller 72, and is converted to the dot data for each ink color by a half-toning technique, such as dithering or error diffusion, in the print controller 80.

In other words, the print controller 80 performs processing for converting the input RGB image data into dot data for the four colors of K, C, M, and Y. Furthermore, the print controller 80 determines the droplet ejection region of the treatment liquid (the region of the recording surface where ejection of treatment liquid is required) on the basis of the dot data of the respective colors, and thus generates dot data for the ejection of treatment liquid droplets. The dot data (for the treatment liquid and the respective colors) generated by the print controller 80 is stored in the image buffer memory 82.

The treatment liquid head driver 83 generates drive control signals for the treatment liquid head 11 on the basis of the dot data for treatment liquid droplet ejection stored in the image buffer memory 82. By supplying the drive control signals generated by the treatment liquid head driver 83 to the treatment liquid head 11, treatment liquid is ejected from the treatment liquid head 11.

Similarly, the ink head driver 84 generates drive control signals for the print head 50 on the basis of the dot data for ink droplet ejection stored in the image buffer memory 82. By supplying the drive control signals generated by the ink head driver 84 to the print head 50, ink is ejected from the print head 50. The treatment liquid head driver 83 and the ink head driver 84 may also each comprise feedback control systems for maintaining uniform drive conditions about the head.

By controlling the ejection of treatment liquid from the treatment liquid head 11 and the ejection of ink from the print head 50 in accordance with the conveyance speed of the recording medium 16, an image is formed on the recording medium 16.

As described above, the ejection volume and the ejection timing of the ink droplets from each nozzle are controlled via the treatment liquid head driver 83 and the ink head driver 84, on the basis of the dot data generated by implementing required signal processing in the print controller 80. By this means, desired dot size and dot arrangement can be achieved.

The inkjet recording apparatus 10 according to this embodiment further includes an ink information reading unit 90, a treatment liquid information reading unit 92, and a medium type determination unit 94. The ink information reading unit 90 is a device for reading in information relating to the ink type. More specifically, it is possible to use, for example, a device which reads in ink identification information or ink properties information from the shape of a cartridge in the ink tank 60 (see FIG. 6) (a specific shape which allows the ink type to be identified), or from a bar code or IC chip incorporated into the cartridge. Besides those, it is also possible that an operator inputs the required information through a user interface.

Similarly, the treatment liquid information reading unit 92 is a device for acquiring information relating to the type of treatment liquid. More specifically, it is possible to use, for example, a device which reads in identification information or properties information relating to the treatment liquid from the shape of the cartridge in the treatment liquid tank (a specific shape which allows the liquid type to be identified), or from a bar code or IC chip incorporated into the cartridge. Besides those, it is also possible that an operator inputs the required information through a user interface.

The medium type determination unit 94 is a device for determining the type and size of the recording medium. This section uses, for example, a device for reading in information (identification information or medium type information) from a bar code attached to the magazine 19 in the medium supply unit 18, or a sensor disposed at a suitable position in the paper conveyance path (such as a medium width determination sensor, a sensor for determining the thickness of the medium, and a sensor for determining the reflectivity of the medium). A suitable combination of these elements may also be used. Furthermore, it is also possible to adopt a composition in which information relating to the paper type, size, or the like, is specified on the basis of inputs made via a prescribed user interface, instead of or in conjunction with such automatic determination devices.

The information acquired from the various devices including the ink information reading unit 90, the treatment liquid information reading unit 92, and the medium type determination unit 94 is sent to the system controller 72, where it is used to control ejection of the treatment liquid and the ink (to control the ejection volume and ejection timing), in such a manner that suitable droplet ejection is performed in accordance with the conditions. More specifically, the system controller 72 determines the permeation speed characteristics of the recording medium 16 on the basis of the information obtained from the respective devices including the ink information reading unit 90, the treatment liquid information reading unit 92, and the medium type determination unit 94. The system controller 72 also determines whether to use a treatment liquid or not, and controls the volume to be ejected if the treatment liquid is to be used.

For example, the inkjet recording apparatus 10 comprises an information storage device (for instance, the ROM 75 shown in FIG. 7, or an internal memory or external memory (not shown)) which stores data for a media type table that associates the media types with the permeation speed characteristics. The system controller 72 determines the permeation speed characteristics of the recording medium 16 used, by referring to this media type table.

As a device for ascertaining the permeation speed characteristics of the recording medium 16, it is possible to obtain the ID (identification information) of the medium from the medium type determination unit 94, and then ascertain the permeation speed characteristics of the media by referring to the media type table. Alternatively, it is possible to record information indicating the permeation speed characteristics of the medium on an information recording body, such as a barcode attached to a magazine, and to then read in the information relating to the permeation speed characteristics of the medium directly from the medium type determination unit 94.

Alternatively, it is also possible to use a device that actually measures the permeation speed of the recording medium 16. For example, ink, treatment liquid, or both ink and treatment liquid are ejected onto the recording medium 16, the state of the dots formed by this test droplet ejection is read in by a determination device (not shown) such as an imaging element, and the permeation speed can be calculated on the basis of the information thus obtained.

As shown in FIG. 1, in the inkjet recording apparatus 10 according to the present embodiment, a composition is adopted in which the treatment liquid head 11 is disposed in an upstream position with respect to the print unit 12, and before ejecting droplets of the ink from the print unit 12, the treatment liquid is previously applied to the print surface of the recording medium 16 by the preceding (upstream) treatment liquid head 11, in a single operation. In the case of this composition, the amount of the treatment liquid on the recording medium 16 gradually declines as the volume of the ink droplets deposited by the print unit 12 increases. Therefore, the further the position toward the downstream side of the print unit 12, the smaller the amount of the treatment liquid remaining on the recording medium 16. It is necessary that some treatment liquid remains on the surface of the recording medium 16 and/or in the vicinity thereof, until droplet ejection by the print head in the final stage (furthest downstream position) of the print unit 12 (in FIG. 1, the yellow head 12Y) has been completed. Therefore, the amount of treatment liquid ejected by the treatment liquid head 11 is determined on the basis of the type of recording medium 16, the properties of the treatment liquid, the ejected ink volume, the conveyance speed of the recording medium 16, and the like, in such a manner that presence of the required amount of treatment liquid can be ensured.

Furthermore, the system controller 72 shown in FIG. 7 controls a solvent absorbing roller drive unit 79 depending on the thickness and permeation speed characteristics of the recording medium 16, and the like, thereby suitably controlling the vertical positioning of the solvent absorbing roller 15 (the contact pressure on the recording medium 16 and/or the clearance with respect to the recording medium 16) and the rotational speed. The solvent absorbing roller drive unit 79 is a device for adjusting the position and rotational speed of the solvent absorbing roller 15 with respect to the recording surface of the recording medium 16. The solvent absorbing roller drive unit 79 comprises an elevator mechanism for moving the solvent absorbing roller 15 upward and downward, an electric motor (actuator) forming a drive source for moving this mechanism and its driver, a drive transmission mechanism (belt, pulley or gear, or a suitable combination of same) which transmits the driving force of the motor to the elevator mechanism, a motor forming a driving source for causing the solvent absorbing roller 15 to rotate and its driver, drive transmission mechanism for same, the heater driver for the heating unit 17 for heating and drying the aggregate generated on the recording medium 16, and the like.

Description of Image Forming Process

Figure 8:
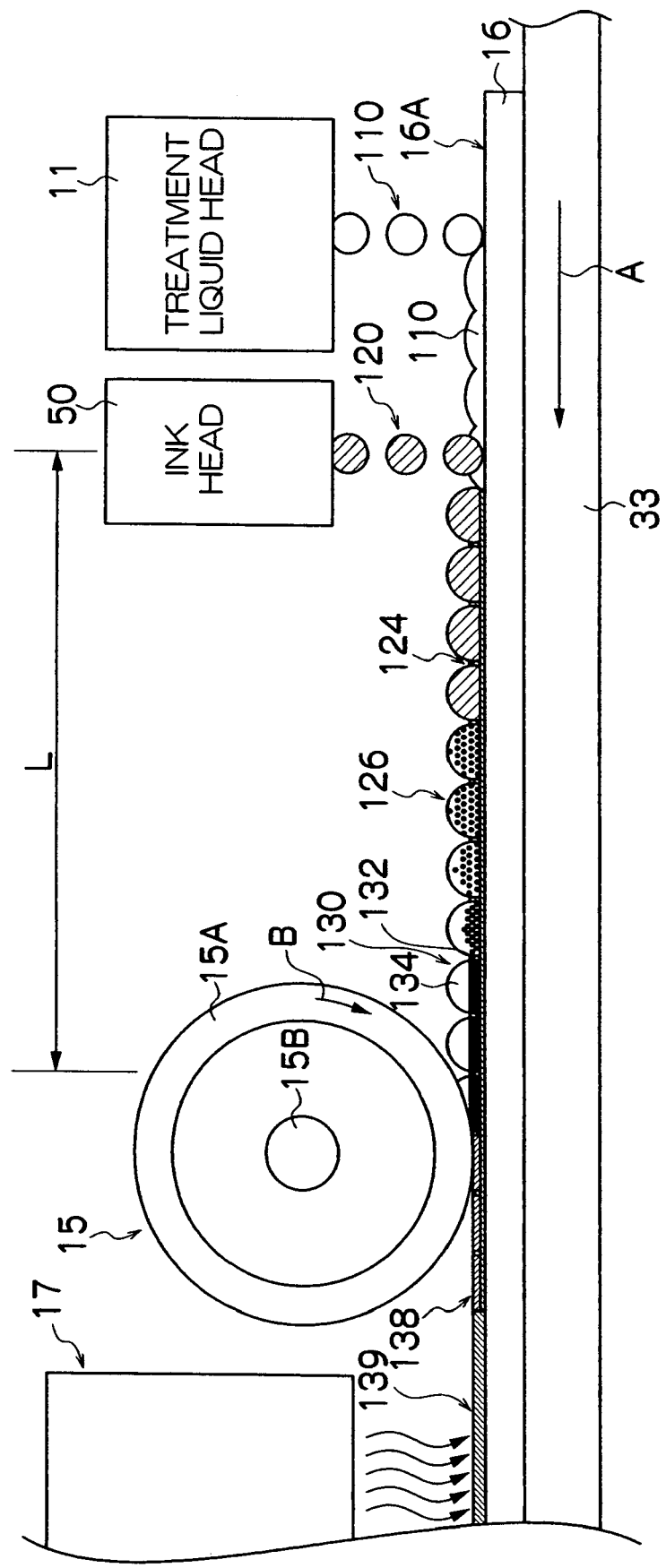
FIG. 8 is an illustrative diagram showing a frame format of an image formation process in the inkjet recording apparatus according to an embodiment of the present invention.

Next, an image forming process in the inkjet recording apparatus 10 according to the present embodiment is described below. FIG. 8 is an enlarged diagram showing a schematic representation of the principal composition at the periphery of the print unit 12 of the inkjet recording apparatus 10. In FIG. 8, in order to simplify the drawings, only one ink head (print head 50) is shown after the treatment liquid head 11; however, the actual print unit 12 is provided with the four print heads 12K, 12C, 12M, and 12Y, for the four respective colors, as shown in FIG. 1.

In FIG. 8, the recording medium 16 is conveyed from right to left. The image forming process is as described below.

(Step 1)

Treatment liquid 110 is ejected in the form of droplets from the treatment liquid head 11 disposed on the upstream side in terms of the recording medium conveyance direction (the direction of arrow A in FIG. 8), thereby the treatment liquid 110 being applied to the recording surface 16A of the recording medium 16 in advance.

(Step 2)

Ink 120 is ejected in the form of droplets from the print head 50 disposed on the downstream side with respect to the treatment liquid head 11 (i.e., after the treatment liquid head 11). In this case, the ink 120 is ejected onto the recording medium while liquid of the treatment liquid 110 remains on the recording surface 16A. In this step 2, the print head 50 ejects the ink 120 in which the volume percentage of pigment particles having a diameter of 150 nm or greater, of the whole pigment particles, is 2 volume percentage or less. In this way, of the whole pigment particles contained in the ink, the volume percentage of pigment particles having a diameter equal to or greater than 150 nm is 2 volume percentage or less; therefore, requirements such as a high fixable property, the expansion of the color reproduction area for secondary color, and ensuring of optical density and prevention of bleeding in the case of high-speed printing, can be met even if an image is formed on a broad range of recording media such as various standard papers that are available commercially, for example.

(Step 3)

The ink 120 is mixed with the treatment liquid 110 on the surface of the recording medium 16, and consequently, the anionic group in the low-molecular dispersant which has been dispersed in the ink 120 together with the coloring material undergoes a pH change by coming into contact with the treatment liquid 110, thus producing an aggregation reaction. A coloring material aggregate 126 is generated by the aggregation of the coloring material in the ink 120.

(Step 4)

As shown in FIG. 8, the coloring material aggregate 126 sinks downward to the recording medium 16 side. In this way, the liquid droplets (dots) 130 of the ink 120 on the recording medium 16 are separated into a coloring material layer 132 including the coloring material aggregate 126 which has sunk, and a layer of solvent 134.

(Step 5)

With the conveyance of the recording medium 16 (the conveyance in the direction of arrow A in FIG. 8), the liquid droplet 130 that has been separated into the coloring material layer 132 and the solvent 134 is moved to the position of the solvent absorbing roller 15. When the solvent 134 in the liquid droplet 130 comes into contact with the solvent absorbing roller 15, then the solvent 134 is absorbed into the solvent absorbing roller 15 by the capillary force of the porous member 15A. The solvent absorbing roller 15 is rotated in the direction of arrow B in FIG. 8 in accordance with the conveyance speed of the recording medium 16, in such a manner that the relative speed of the roller with respect to the recording medium 16 is zero, thereby preventing disturbance of the image due to rubbing of the ink. Furthermore, in this case, since the polymer film 124 is formed around the periphery of the dots 130, then the movement of the coloring material on the surface of the recording medium 16 is suppressed, and adherence of the coloring material to the solvent absorbing roller 15 is prevented, thereby avoiding disturbance of the image, and the like. More specifically, when the solvent is absorbed by the solvent absorbing roller 15, the film 124 is present between the dots. Hence, this film 124 has the role of suppressing the movement of the ink and preventing disturbance of the image during contact between the solvent absorbing roller 15 and the ink.

The positional relationship between the print head 50 and the solvent absorbing roller 15 (the distance L from the position of the ink landing on the recording medium to the position of the solvent contacting with the roller), and the conveyance speed of the recording medium 16, are set in such a manner that the time period from the landing time of the ink 120 ejected from the print head 50 (in other words, from the mixing time of the two liquids) until the contact time between the solvent 134 and the solvent absorbing roller 15 is longer than the time period taken from the landing time of the ink 120 until the completion time of separation between the coloring material and solvent due to the two-liquid reaction.

(Step 6)

In the ink from which the solvent has been removed by the solvent absorbing roller 15 in this way (reference numeral 138 in FIG. 8), the coupling force between the coloring material bodies increases, and the coloring material becomes fixed onto the recording medium 16. Thereby, the occurrence of bleeding is prevented, and furthermore, beneficial effects are obtained in that bleeding between colors is prevented, drying and fixing are promoted, and cockling is avoided, and the like.

(Step 7)

Subsequently, a hot airflow heated to a temperature of approximately 30° C. by the heating unit 17 is directed to the recording medium 16, thereby causing the solvent component contained in the coloring material aggregate 126 to evaporate and dry. Furthermore, the polymer micro-particles dispersed with the coloring material dry and harden to form a film, whereby the coloring material becomes fixed reliably on the recording medium 16 (reference numeral 139). Moreover, since the polymer micro-particles are hydrophobic, then the water resistance is also improved. Consequently, a print having excellent rubbing resistance, water resistance and fixing properties is obtained.

WORKING EXAMPLES

Next, the present invention is described in detail by means of working examples, but the present invention is not limited to these examples. In the following description, the symbol "%" refers to the "weight percentage (mass standard)", unless stated otherwise.

Practical Example 1

Practical example 1 involved an experiment which studied how the ratio of the pigment particles having a particle diameter (particle size) of 150 nm or greater, with respect to the whole of the pigment particles contained in the first liquid (ink), affects the optical density, bleeding, fixing strength and color reproduction of secondary colors.

Preparation of Ink Compositions A to H as First Liquid

The compositional components listed below were mixed in such a manner that the total quantity was 500 mass by weight, 2 mass by weight of 2,2'-azobis(2,4-dimethyl valeronitrile) was added as a polymerization initiator, and sufficient nitrogen gas substitution was carried out to yield a synthetic resin mixture liquid.

- stearyl methacrylate: 20 mass by weight
- styrene macromer: 5 mass by weight
- styrene: 10 mass by weight
- polypropylene glycol (9) methacrylate: 10 mass by weight
- methacrylic acid: 10 mass by weight
- 2-mercaptoethanol: 0.1 mass by weight.

The names given above have the following meanings.

Styrene macromer: manufactured by Toa Gosei (Co. Ltd.), product name: AS-6 (styrene homopolymerization macromer), number average molecular weight: 6000, polymerizable functional group: methacryloyloxy group)

Polypropylene glycol (9) methacrylate: manufactured by Nippon Oil & Fats Co., Ltd., product name: "Blemmer" PP-500 (number of added moles of propylene oxide: 9)

Next, 500 mass by weight of methyl ethyl ketone was heated to a temperature of 75° C. while it was agitated in a nitrogen atmosphere. The aforementioned synthetic resin mixture liquid was added dropwise over a period of 4 hours, while it was agitated at 75° C. Reaction was continued for a further 6 hours while it was agitated at 75° C. Thereupon, the reactive synthesis product was cooled naturally to a temperature of 25° C., and then diluted by adding methyl ethyl ketone in such a manner that the solid content became 50%, thereby yielding a dispersed resin solution having an average molecular weight of 19,000.

15 mass by weight of the 50% copolymer solution thus obtained was taken and neutralized by adding 2 mass by weight of 5 mol/L aqueous sodium hydroxide, and furthermore, 7.5 mass by weight of Pigment Red 122 (product name: CROMOPHTAL Jet Magenta DMQ; manufactured by Ciba Specialty Chemicals (Co. Ltd.)) was added and the mixture was kneaded for 2 to 8 hours, according to requirements, by means of a roll mill. The kneaded mixture was dispersed in 100 mass by weight of ion exchange water (deionized water). The organic solvent was removed completely from the dispersion thus obtained, under reduced pressure at 60° C., and the dispersion was further concentrated by removing water, thereby yielding an aqueous dispersion of pigment-containing vinyl polymer particles having a solid content concentration of 20 wt %. Thereupon, an ink composition was obtained by mixing together the following components.

The above-described aqueous dispersion of pigment-containing vinyl polymer particles: 40 mass by weight
glycerine: 8 mass by weight
diethylene glycol: 8 mass by weight
triethanol amine: 1 mass by weight
Olefin E1010 (manufactured by Nisshin Chemical Industry Co., Ltd.): 1 mass by weight
triethylene glycol monobutyl ether: 8 mass by weight
ion exchange water (deionized water): 36 mass by weight When the pH of the ink composition of an ink liquid prepared in this way was measured with a pH meter-WM-50EG (manufactured by Toa DKK Corporation), the pH was found to be 8.5.

The ink liquid was subjected to at least one of centrifugal separation (at 10,000 to 20,000 rpm for 30 min to 2 hours, as required), ultrafiltration, and filtering, thereby separating the ink liquid. The first liquids A to H were prepared by altering the volume average particle diameter and the ratio of pigment particles having a particle diameter equal to or greater than 150 nm with respect to the whole of the pigment particles, as shown in Table 1.

The particle diameter in the pigment ink was measured by means of the following method. Using a Nanotrac particle diameter distribution measurement apparatus UPA-EX150 manufactured by Nikkiso Co., Ltd., and entering the values: refractive index of particles=1.5, particle shape=non-spherical, pigment density=1.2, the particle diameter was measured in a 100 times dilution in water, at a temperature of 25° C. The following table shows the measured values for the volume average particle diameter (size) and the volume % of particles having a size of 150 nm or greater.

TABLE 1

| Ink composition | Vol % of particles of diameter 150 nm or greater | Volume average particle diameter (nm) | Remarks |
|---|---|---|---|
| Ink A | 5.0 | 70 | Comparative Example |
| Ink B | 2.2 | 70 | Comparative Example |
| Ink C | 2.0 | 70 | Present invention |
| Ink D | 0.1 | 70 | Present invention |
| Ink E | 2.2 | 50 | Comparative Example |
| Ink F | 2.0 | 50 | Present invention |
| Ink G | 2.2 | 25 | Comparative Example |
| Ink H | 2.0 | 25 | Present invention |

Preparation of Liquid Composition Which Enhances Printing Characteristics to Form Second Liquid A liquid composition forming a second liquid (treatment liquid) was prepared by weighing, mixing and agitating the following compounds.

diethylene glycol: 20.0 mass by weight
Olefin E1010: 1.0 mass by weight
2-pyrrolidone-5-carboxylic acid: 5.0 mass by weight
sodium hydroxide: 0.95 mass by weight
ion exchange water (deionized water): 73.1 mass by weight When the pH of the liquid composition of a second liquid prepared in this way was measured with a pH meter-WM-50EG (manufactured by Toa DKK Corporation), the pH was found to be 3.5.

Thereupon, the following assessment was carried out by using an image recording apparatus equipped with a trial print head having 256 nozzles and a resolution of 600 dpi. FX-L paper (made by Fuji Xerox Co., Ltd.) was used as the recording medium. Furthermore, unless expressly stated otherwise below, printing was carried out under general conditions (temperature: 20±0.5° C.; humidity: 50±5% RH) and the printed objects were subjected to various assessments after having been left in a normal environment for 24 hours after printing. With regard to the optical density, bleeding, fixing strength and the reproduction of secondary colors, printing was performed onto the recording medium by first applying the second liquid containing a liquid composition for enhancing printing characteristics and then applying the first liquid and thus making the first liquid come into contact with the second liquid. The optical density, bleeding characteristics, and fixing strength were measured in the following ways.

Optical Density

Printing was carried out by applying the second liquid and the first liquid in a 100% coverage pattern, and the optical density was measured using an X-Rite 404 (manufactured by X-Rite Inc.).

Bleeding

A fine line pattern was printed on a recording medium by applying the second liquid and the first liquid, and the extent of bleeding in the printed section was compared with a limit sample, and assessed visually. The assessment criteria were as follows.

very good: virtually no bleeding occurred
good: little bleeding average: bleeding occurred, but of a tolerable level
poor: severe bleeding, beyond range of tolerance Fixing Level A sheet of white FX-L paper was pressed with a load of $4.9 \times 10^4$ N/m² onto a recording medium which had been printed with a 100% coverage pattern by applying the second liquid and the first liquid. The ink that was transferred to the white FX-L paper was compared with a previously determined limit sample and assessed visually.

good: no soiling
average: slight soiling
poor: marked soiling
very poor: very marked soiling Reproduction of Secondary Colors A 100% coverage pattern was printed using cyan ink, and a 100% coverage pattern was printed using the liquid composition for enhancing printing characteristics and a magenta ink composition. The saturation of the blue sample thus obtained was determined from the color difference L*a*b measured by a standard method, and ranked in one of three levels.

good: high saturation; good color reproduction
average: slightly low saturation; poorer color reproduction
poor: low saturation; poor color reproduction Moreover, in experiments 105 and 106 where the volume average particle diameter of the pigment particles was 50 nm and in experiments 107 and 108 where the volume average particle diameter was 25 nm, the results were the same as those in experiment 101 to experiment 104. Therefore, it was possible to achieve good results in terms of the optical density, bleeding characteristics, fixing strength and reproduction of secondary colors, by setting the ratio of pigment particles having a particle diameter equal to or greater than 150 nm, to 2 volume % or less with respect to the whole of the pigment particles.

Furthermore, a comparison between the experiments 102, 105 and 107, which had the same value of 2.2 volume % for the aforementioned ratio, and a comparison between the experiments 103, 106 and 108, which had the same value of 2.0 volume % for the aforementioned ratio, revealed that at the same value of the ratio of large particles, better results could be obtained, the smaller the volume average particle diameter.

From the foregoing results, it was found that, in an ink set having a first liquid containing pigment particles and a second liquid containing a liquid composition which enhances printing characteristics, the optical density, bleeding fixing strength and reproduction of secondary colors could be

TABLE 2

| Experiment No. | Pigment Ink | Vol % of particles of diameter 150 nm or greater | Volume average particle diameter (nm) | Optical density | Bleeding | Fixing strength | Reproduction of secondary colors | Remarks |
|---|---|---|---|---|---|---|---|---|
| 101 | Ink A | 5.0 | 70 | 1.60 | average | average | poor | Comparative Example |
| 102 | Ink B | 2.2 | 70 | 1.70 | average | average | average | Comparative Example |
| 103 | Ink C | 2.0 | 70 | 1.75 | good | good | good | Present Invention |
| 104 | Ink D | 0.1 | 70 | 1.80 | very good | good | good | Present Invention |
| 105 | Ink E | 2.2 | 50 | 1.75 | good | average | average | Comparative Example |
| 106 | Ink F | 2.0 | 50 | 1.80 | very good | good | good | Present Invention |
| 107 | Ink G | 2.2 | 25 | 1.75 | good | average | average | Comparative Example |
| 108 | Ink H | 2.0 | 25 | 1.80 | very good | good | good | Present Invention |

In experiment 101 to experiment 104 in Table 2, the ratio of pigment particles having a particle diameter equal to or greater than 150 nm, with respect to the whole of the pigment particles, was varied from 5.0 volume % to 0.1 volume %, in the inks A, B, C and D which contained pigment particles having a volume average particle diameter of 70 nm.

As a result of this, it was found that the optical density improved, the lower the ratio of particles of the aforementioned size. Furthermore, in experiments 101 and 102, where the ratio exceeded 2 volume %, the bleeding, fixing strength and second color reproduction received assessments of average or poor, which did not indicated good results. On the other hand, in the case of experiments 103 and 104, where the ratio was equal to or less than 2 volume %, the assessments were good or very good, which indicated good results.

improved by setting the ratio occupied by pigment particles having a particle diameter equal to or greater than 150 nm, in the whole of the pigment particles, to be 2 volume % or less.

Practical Example 2

Practical example 2 involved an experiment which investigated how the pH differential between the first liquid and the second liquid affected the optical density, bleeding characteristics, fixing strength and secondary color reproduction.

The inks J, K, L, M in experiments 201 to 207 all had the same volume average particle diameter and particle ratio as those of ink C in practical example 1, but the pH of these inks was varied.

TABLE 3

| Experiment No. | Pigment Ink | Vol % of particles of diameter 150 nm or greater | Volume average particle size (nm) | pH of ink liquid | pH of liquid composition | pH diff. | Optical density | Bleeding | Fixing strength | Reproduction of secondary colors |
|---|---|---|---|---|---|---|---|---|---|---|
| 201 | Ink J | 2.0 | 70 | 9.0 | 3.0 | 6.0 | 1.75 | good | average | good |
| 202 | Ink K | 2.0 | 70 | 9.0 | 3.5 | 5.5 | 1.75 | good | good | good |
| 203 | Ink C | 2.0 | 70 | 8.5 | 3.5 | 5 | 1.75 | good | good | good |
| 204 | Ink L | 2.0 | 70 | 6.5 | 3.5 | 3 | 1.75 | good | good | good |
| 205 | Ink M | 2.0 | 70 | 6.0 | 3.5 | 2.5 | 1.70 | average | average | good |
| 206 | Ink C | 2.0 | 70 | 8.5 | 5.5 | 3 | 1.70 | good | good | good |
| 207 | Ink C | 2.0 | 70 | 8.5 | 6.0 | 2.5 | 1.65 | average | average | good |

Consequently, as revealed by experiments 201 to 207 in Table 3, it was seen that from the viewpoint of optical density, bleeding characteristics, fixing strength and secondary color reproduction, it is even more desirable to set the absolute value of the pH difference between the first liquid and the second liquid, to a range between 3.0 and 5.5, both inclusive.

Practical Example 3

Practical example 3 involved an assessment of the use of polyvalent metallic salt and polyarylamine, as the second liquid, under the same conditions as Practical example 1.

Preparation of Liquid Composition of Polyvalent Metallic Salt, to Form Second Liquid
  magnesium nitrate hexahydrate: 15.0 mass by weight
  glycerine: 15.0 mass by weight
  Olefin E1010: 1.0 mass by weight
  ion exchange water (deionized water): 69.0 mass by weight Preparation of Liquid Composition of Polyarylamine, to Form Second Liquid
  polyarylamine PAA-HCl-3L: 15.0 mass by weight (resin component 50%, manufactured by Nitto Boseki Co., Ltd.)
  diethylene glycol: 20.0 mass by weight
  Olefin E1010: 1.0 mass by weight
  ion exchange water (deionized water): 64.0 mass by weight As a result of the experiment in Practical example 3, it was found that even in cases where a polyvalent metallic salt or polyarylamine was used as the second liquid, the optical density, bleeding characteristics, fixing strength and secondary color reproduction could be improved by setting the ratio of pigment particles having a particle diameter equal to or greater than 150 nm, to 2 volume % or less with respect to the whole of the pigment particles.

Practical Example 4

Practical example 4 involved an assessment of cases where, instead of the C.I. Pigment Red 122 in Practical example 1 and Practical example 3 described above, C.I. Pigment Yellow 12, 17, 55, 74, 97, 120, 128, 151, 155, 180, C.I. Pigment Violet 19, C.I. Pigment Red 57:1, 146, and C.I. Pigment Blue 15:3 were used as the pigment particles, under the same conditions as Practical example 1 and Practical example 3.

As a result, it was found that even if the type of pigment was changed, the optical density, bleeding characteristics, fixing strength and secondary color reproduction could be improved by setting the ratio of pigment particles having a particle diameter equal to or greater than 150 nm, to 2 volume % or less with respect to the whole of the pigment particles.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An ink set for inkjet recording comprising:
  a first liquid which contains at least a water-soluble solvent, water, and pigment particles dispersed and retained in a medium including the water-soluble solvent and the water; and
  a second liquid which does not contain coloring material but contains at least a water-soluble solvent, water, and a liquid composition which enhances printing characteristics, wherein:
  an image is formed by making the first liquid and the second liquid come into contact with each other on a recording medium; and
  a ratio of pigment particles having a particle diameter of not less than 150 nm is not greater than 2 volume percent with respect to a whole of the pigment particles contained in the first liquid.

2. The ink set for inkjet recording as defined in claim 1, wherein the ratio is not greater than 1 volume percent.

3. The ink set for inkjet recording as defined in claim 1, wherein the ratio is not greater than 0.5 volume percent.

4. The ink set for inkjet recording as defined in claim 1, wherein at least one of the first liquid and the second liquid further comprises polymer microparticles.

5. The ink set for inkjet recording as defined in claim 4, wherein a glass transition temperature Tg of the polymer microparticles is not less than 30° C.

6. The ink set for inkjet recording as defined in claim 1, wherein:
  one of the first liquid and the second liquid is alkaline, and the other of the first liquid and the second liquid is acidic; and
  the second liquid has an action of causing the pigment particles contained in the first liquid to aggregate when the first liquid and the second liquid come into contact with each other.

7. The ink set for inkjet recording as defined in claim 6, wherein:
  the liquid composition contained in the second liquid has an action of causing the pigment particles contained in the first liquid to aggregate; and the liquid composition contains one of a polyvalent metallic salt and polyarylamine.

8. The ink set for inkjet recording as defined in claim 1, wherein an absolute value of a pH differential between the first liquid and the second liquid is not less than 3.0 and not greater than 5.5.

9. The ink set for inkjet recording as defined in claim 1, wherein the pigment particles are any one of C.I. Pigment Yellow 12, 17, 55, 74, 97, 120, 128,151,155 and 180.

10. The ink set for inkjet recording as defined in claim 1, wherein the pigment particles are any one of C.I. Pigment Red 122, C.I. Pigment Violet 19, C.I. Pigment Red 57:1 and 146, and C.I. Pigment Blue 15:3.

11. An ink unit in which at least black ink, cyan ink, magenta ink and yellow ink are taken as one unit, wherein all of the black ink, the cyan ink, the magenta ink and the yellow ink are constituted by the ink set for inkjet recording as defined in claim 1.

12. An image recording apparatus using the ink set for inkjet recording as defined in claim 1, the image recording apparatus comprising:

a first application device which applies the second liquid of the ink set to the recording medium;

a second application device which applies the first liquid of the ink set to the second liquid on the recording medium; and a heating device which heats an aggregate produced by contact between the first liquid and the second liquid.

13. An image recording method comprising the steps of:

applying a second liquid of an ink set to a recording medium; and applying a first liquid of the ink set to the second liquid so that the first liquid and the second liquid come into contact with each other to form an image, wherein the ink set comprises the first liquid which contains at least a water-soluble solvent, water, and pigment particles dispersed and retained in a medium including the water-soluble solvent and the water; and the second liquid which does not contain coloring material but contains at least a water-soluble solvent, water, and a liquid composition which enhances printing characteristics, wherein a ratio of pigment particles having a particle diameter of not less than 150 nm is not greater than 2 volume percent with respect to a whole of the pigment particles contained in the first liquid.

* * * * *